(12) United States Patent
Sadek

(10) Patent No.: US 10,334,588 B2
(45) Date of Patent: *Jun. 25, 2019

(54) CARRIER SENSE ADAPTIVE TRANSMISSION (CSAT) COORDINATION IN UNLICENSED SPECTRUM

(71) Applicant: QUALCOMM Incorporated, San Diego, CA (US)

(72) Inventor: Ahmed Kamel Sadek, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 297 days.

This patent is subject to a terminal disclaimer.

(21) Appl. No.: 14/566,068

(22) Filed: Dec. 10, 2014

(65) Prior Publication Data

US 2015/0163801 A1    Jun. 11, 2015

Related U.S. Application Data

(60) Provisional application No. 61/914,729, filed on Dec. 11, 2013.

(51) Int. Cl.
*H04W 72/04* (2009.01)
*H04W 72/12* (2009.01)
(Continued)

(52) U.S. Cl.
CPC ........ *H04W 72/0446* (2013.01); *H04L 1/00* (2013.01); *H04W 48/00* (2013.01);
(Continued)

(58) Field of Classification Search
None
See application file for complete search history.

(56) References Cited

U.S. PATENT DOCUMENTS 7,801,490 B1 * 9/2010 Scherzer ............ H04B 17/382
370/328
8,681,627 B2   3/2014 Choudhury et al.
(Continued)

FOREIGN PATENT DOCUMENTS

CN    101174851 A    5/2008
EP    2157826 A2    2/2010
(Continued)

OTHER PUBLICATIONS

International Search Report and Written Opinion—PCT/US2014/069673—ISA/EPO—Jun. 15, 2015.
(Continued)

*Primary Examiner* — Christopher M Crutchfield
*Assistant Examiner* — Thinh D Tran
(74) *Attorney, Agent, or Firm* — Muncy, Geissler, Olds & Lowe, P.C.

(57) ABSTRACT

Systems and methods for Carrier Sense Adaptive Transmission (CSAT) communication in unlicensed spectrum are disclosed. Interference between Radio Access Technologies (RATs) may be reduced utilizing CSAT by, for example: receiving signals via a resource, wherein a first RAT is used to receive the signals; identifying utilization of the resource associated with the first RAT, wherein the identification is based on the received signals; cycling operation of a second RAT between activated and deactivated periods of transmission over the resource in accordance with a Time Division Multiplexing (TDM) communication pattern, wherein the cycling is based on the identified utilization of the resource; and transmitting an Activation/Deactivation Medium Access Control (MAC) Control Element (CE) to a user device associated with the second RAT to activate or deactivate the user device in accordance with the TDM communication pattern.

26 Claims, 14 Drawing Sheets

(51) Int. Cl.
*H04W 72/08* (2009.01)
*H04L 1/00* (2006.01)
*H04W 48/00* (2009.01)
*H04W 76/15* (2018.01)
*H04W 74/08* (2009.01)

(52) U.S. Cl.
CPC ..... *H04W 72/082* (2013.01); *H04W 72/1215* (2013.01); *H04W 72/1263* (2013.01); *H04W 76/15* (2018.02); *H04L 1/0003* (2013.01); *H04L 1/0009* (2013.01); *H04W 74/0808* (2013.01)

(56) References Cited

U.S. PATENT DOCUMENTS

| | | |
|---|---|---|
| 2005/0054359 A1 | 3/2005 | Ishii et al. |
| 2006/0268705 A1 | 11/2006 | Kurobe et al. |
| 2008/0253341 A1 | 10/2008 | Cordeiro et al. |
| 2009/0122717 A1* | 5/2009 | Das ............ H04L 47/10 370/253 |
| 2009/0238098 A1 | 9/2009 | Cai et al. |
| 2011/0105107 A1* | 5/2011 | Kwon ............ H04W 28/06 455/422.1 |
| 2011/0170420 A1* | 7/2011 | Xi ............ H04L 5/001 370/241 |
| 2011/0194593 A1 | 8/2011 | Geirhofer et al. |
| 2011/0310795 A1* | 12/2011 | Andersson ........ H04W 72/1231 370/328 |
| 2012/0026944 A1* | 2/2012 | Yamada ............ H04L 1/003 370/328 |
| 2012/0188907 A1* | 7/2012 | Dayal ............ H04W 72/1215 370/254 |
| 2012/0188965 A1* | 7/2012 | Pani ............ H04W 52/38 370/329 |
| 2012/0207040 A1* | 8/2012 | Comsa ............ H04W 72/1215 370/252 |
| 2013/0195145 A1 | 8/2013 | Soliman et al. |
| 2013/0201884 A1* | 8/2013 | Freda ............ H04W 72/005 370/278 |
| 2013/0208587 A1* | 8/2013 | Bala ............ H04W 16/14 370/230 |
| 2013/0315124 A1* | 11/2013 | Rapaport ............ H04W 4/08 370/312 |
| 2014/0056245 A1 | 2/2014 | Qin et al. |
| 2014/0079028 A1 | 3/2014 | Ozluturk |
| 2014/0080501 A1 | 3/2014 | Lee et al. |
| 2014/0286300 A1* | 9/2014 | Choi ............ H04B 7/0617 370/329 |

FOREIGN PATENT DOCUMENTS

| | | |
|---|---|---|
| EP | 2574094 A1 | 3/2013 |
| JP | 2005086588 A | 3/2005 |
| JP | 2012004608 A | 1/2012 |
| KR | 20120123392 A | 11/2012 |
| KR | 20130054662 A | 5/2013 |
| WO | 2008070777 | 6/2008 |
| WO | 2012134178 A2 | 10/2012 |
| WO | 2013116662 A1 | 8/2013 |
| WO | 2013131257 A1 * | 9/2013 |

OTHER PUBLICATIONS

Samsung: "Possible TDM Solution for LTE, WiFi and BT In-device Coexistence", 3GPP Draft; R2-105572, 3rd Generation Partnership Project (3GPP), Mobile Competence Centre ; 650, Route Des Lucioles; F-06921 Sophia-Antipolis Cedex; France, vol. RAN WG2, no. Xi'an; Oct. 11, 2010, Oct. 15, 2010 (Oct. 15, 2010), pp. 1-5, XP050452632, [retrieved on Oct. 5, 2010].

* cited by examiner

CARRIER SENSE ADAPTIVE TRANSMISSION (CSAT) COORDINATION IN UNLICENSED SPECTRUM

CROSS-REFERENCE TO RELATED APPLICATIONS

The present Application for Patent claims the benefit of U.S. Provisional Application No. 61/914,729, entitled "RAT TDM COMMUNICATION SCHEME NOTIFICATION AND SCHEDULING IN UNLICENSED SPECTRUM," filed Dec. 11, 2013, assigned to the assignee hereof, and expressly incorporated herein by reference in its entirety.

INTRODUCTION

Aspects of this disclosure relate generally to telecommunications, and more particularly to interference co-existence and the like.

Wireless communication systems are widely deployed to provide various types of communication content, such as voice, data, multimedia, and so on. Typical wireless communication systems are multiple-access systems capable of supporting communication with multiple users by sharing available system resources (e.g., bandwidth, transmit power, etc.). These systems are often deployed in conformity with specifications such as Long Term Evolution (LTE) provided by the Third Generation Partnership Project (3GPP), Ultra Mobile Broadband (UMB) and Evolution Data Optimized (EV-DO) provided by the Third Generation Partnership Project 2 (3GPP2), 802.11 provided the Institute of Electrical and Electronics Engineers (IEEE), etc.

In cellular networks, "macro cell" base stations provide connectivity and coverage to a large number of users over a certain geographical area. A macro network deployment is carefully planned, designed, and implemented to offer good coverage over the geographical region. Even such careful planning, however, cannot fully accommodate channel characteristics such as fading, multipath, shadowing, etc., especially in indoor environments. Indoor users therefore often face coverage issues (e.g., call outages and quality degradation) resulting in poor user experience.

To improve indoor or other specific geographic coverage, such as for residential homes and office buildings, additional "small cell," typically low-power base stations have recently begun to be deployed to supplement conventional macro networks. Small cell base stations may also provide incremental capacity growth, richer user experience, and so on.

Recently, small cell LTE operations, for example, have been extended into the unlicensed frequency spectrum such as the Unlicensed National Information Infrastructure (U-NII) band used by Wireless Local Area Network (WLAN) technologies. This extension of small cell LTE operation is designed to increase spectral efficiency and hence capacity of the LTE system. However, it may also encroach on the operations of other Radio Access Technologies (RATs) that typically utilize the same unlicensed bands, most notably IEEE 802.11x WLAN technologies generally referred to as "Wi-Fi."

One approach to interference management for such a co-existence environment is to modify various communication parameters. However, it may be difficult to effectively convey the modified communication parameters to other devices, especially legacy devices. There therefore remains a need for improved coordination among the various devices operating in the increasingly crowded unlicensed frequency spectrum.

SUMMARY

Systems and methods for Carrier Sense Adaptive Transmission (CSAT) communication in unlicensed spectrum are disclosed.

A method of CSAT for reducing interference between Radio Access Technologies (RATs) is disclosed. The method may comprise, for example: receiving signals via a resource, wherein a first RAT is used to receive the signals; identifying utilization of the resource associated with the first RAT, wherein the identification is based on the received signals; cycling operation of a second RAT between activated and deactivated periods of transmission over the resource in accordance with a Time Division Multiplexing (TDM) communication pattern, wherein the cycling is based on the identified utilization of the resource; and transmitting an Activation/Deactivation Medium Access Control (MAC) Control Element (CE) to a user device associated with the second RAT to activate or deactivate the user device in accordance with the TDM communication pattern.

An apparatus for CSAT for reducing interference between RATs is also disclosed. The apparatus may comprise, for example, a first transceiver, a processor, and a second transceiver. The first transceiver may be configured to receive signals via a resource, wherein a first RAT is used to receive the signals. The processor may be configured to identify utilization of the resource associated with the first RAT, wherein the identification is based on the received signals, and to cycle operation of a second RAT between activated and deactivated periods of transmission over the resource in accordance with a TDM communication pattern, wherein the cycling is based on the identified utilization of the resource. The second transceiver may be configured to transmit an Activation/Deactivation MAC CE to a user device associated with the second RAT to activate or deactivate the user device in accordance with the TDM communication pattern.

Another apparatus for CSAT for reducing interference between RATs is also disclosed. The apparatus may comprise, for example: means for receiving signals via a resource, wherein a first RAT is used to receive the signals; means for identifying utilization of the resource associated with the first RAT, wherein the identification is based on the received signals; means for cycling operation of a second RAT between activated and deactivated periods of transmission over the resource in accordance with a TDM communication pattern, wherein the cycling is based on the identified utilization of the resource; and means for transmitting an Activation/Deactivation MAC CE to a user device associated with the second RAT to activate or deactivate the user device in accordance with the TDM communication pattern.

A computer-readable medium is also disclosed that comprises instructions, which, when executed by a processor, cause the processor to perform operations for CSAT for reducing interference between RATs. The computer-readable medium may comprise, for example: instructions for receiving signals via a resource, wherein a first RAT is used to receive the signals; instructions for identifying utilization of the resource associated with the first RAT, wherein the identification is based on the received signals; instructions for cycling operation of a second RAT between activated and deactivated periods of transmission over the resource in accordance with a TDM communication pattern, wherein the cycling is based on the identified utilization of the resource; and instructions for transmitting an Activation/Deactivation MAC CE to a user device associated with the second RAT to activate or deactivate the user device in accordance with the TDM communication pattern.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

The present disclosure relates generally to coordinating Carrier Sense Adaptive Transmission (CSAT) communication with user devices via Activation/Deactivation Medium Access Control (MAC) Control Element (CE) commands. Utilization of Activation/Deactivation MAC CE commands may help to improve synchronization with user devices and provide support for legacy devices. To further enhance system efficiency, the user devices may be activated in a certain activation order based on their respective link qualities, and scheduled for data transmissions in a reverse order to activation. For some user devices, it may be advantageous to further utilize Radio Resource Control (RRC) connection messages in addition to MAC CE commands. Various other enhancements and refinements are provided in more detail below.

More specific aspects of the disclosure are provided in the following description and related drawings directed to various examples provided for illustration purposes. Alternate aspects may be devised without departing from the scope of the disclosure. Additionally, well-known aspects of the disclosure may not be described in detail or may be omitted so as not to obscure more relevant details.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., Application Specific Integrated Circuits (ASICs)), by program instructions being executed by one or more processors, or by a combination of both. In addition, for each of the aspects described herein, the corresponding form of any such aspect may be implemented as, for example, "logic configured to" perform the described action.

Figure 1:
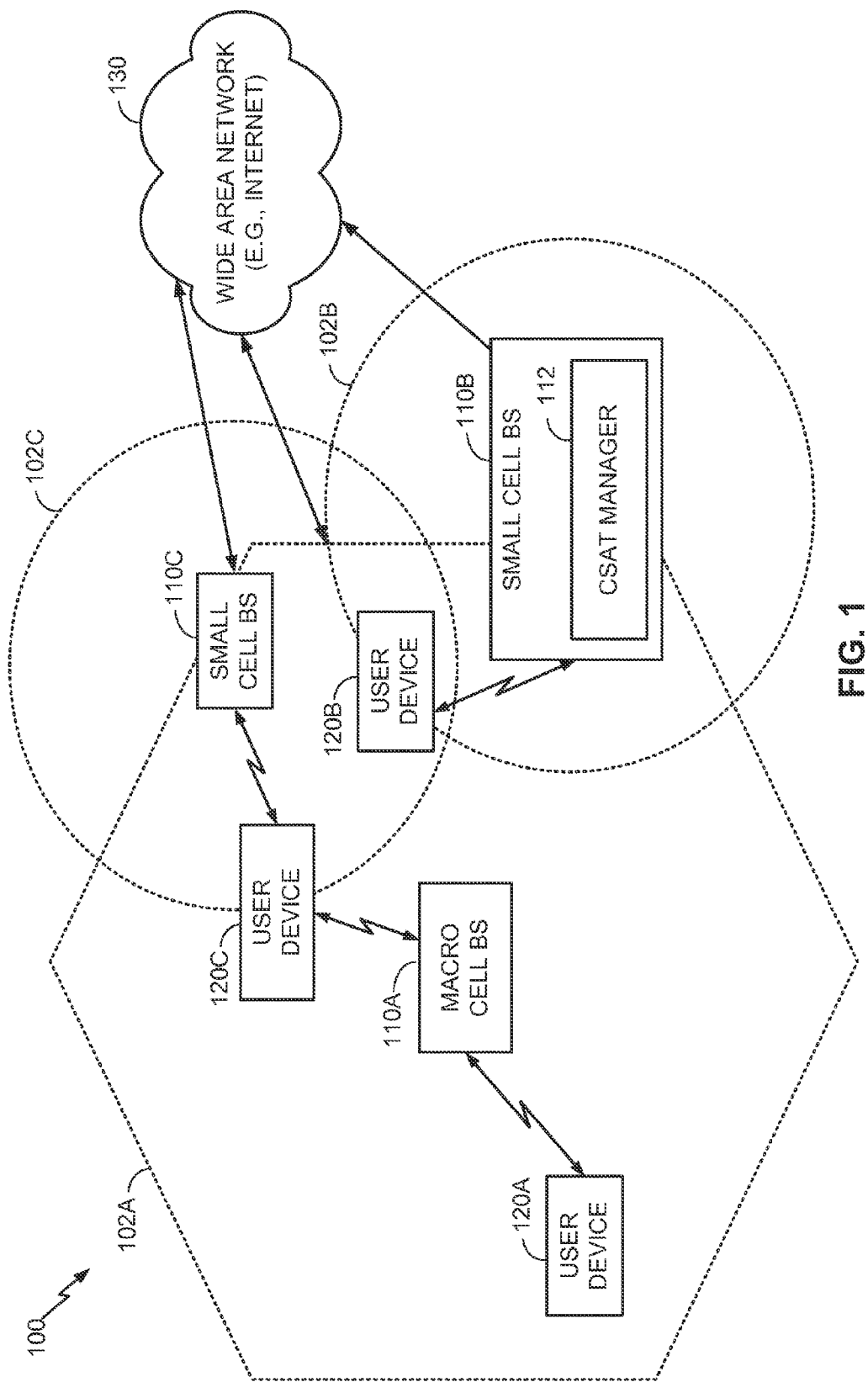
FIG. 1 illustrates an example mixed-deployment wireless communication system including macro cell base stations and small cell base stations.

FIG. 1 illustrates an example mixed-deployment wireless communication system, in which small cell base stations are deployed in conjunction with and to supplement the coverage of macro cell base stations. As used herein, small cells generally refer to a class of low-powered base stations that may include or be otherwise referred to as femto cells, pico cells, micro cells, etc. As noted in the background above, they may be deployed to provide improved signaling, incremental capacity growth, richer user experience, and so on.

The illustrated wireless communication system 100 is a multiple-access system that is divided into a plurality of cells 102 and configured to support communication for a number of users. Communication coverage in each of the cells 102 is provided by a corresponding base station 110, which interacts with one or more user devices 120 via DownLink (DL) and/or UpLink (UL) connections. In general, the DL corresponds to communication from a base station to a user device, while the UL corresponds to communication from a user device to a base station.

As will be described in more detail below, these different entities may be variously configured in accordance with the teachings herein to provide or otherwise support the CSAT coordination discussed briefly above. For example, one or more of the small cell base stations 110 may include a CSAT management module 112.

As used herein, the terms "user device" and "base station" are not intended to be specific or otherwise limited to any particular Radio Access Technology (RAT), unless otherwise noted. In general, such user devices may be any wireless communication device (e.g., a mobile phone, router, personal computer, server, etc.) used by a user to communicate over a communications network, and may be alternatively referred to in different RAT environments as an Access Terminal (AT), a Mobile Station (MS), a Subscriber Station (STA), a User Equipment (UE), etc. Similarly, a base station may operate according to one of several RATs in communication with user devices depending on the network in which it is deployed, and may be alternatively referred to as an Access Point (AP), a Network Node, a NodeB, an evolved NodeB (eNB), etc. In addition, in some systems a base station may provide purely edge node signaling functions while in other systems it may provide additional control and/or network management functions.

Returning to FIG. 1, the different base stations 110 include an example macro cell base station 110A and two example small cell base stations 110B, 110C. The macro cell base station 110A is configured to provide communication coverage within a macro cell coverage area 102A, which may cover a few blocks within a neighborhood or several square miles in a rural environment. Meanwhile, the small cell base stations 110B, 110C are configured to provide communication coverage within respective small cell coverage areas 102B, 102C, with varying degrees of overlap existing among the different coverage areas. In some systems, each cell may be further divided into one or more sectors (not shown).

Turning to the illustrated connections in more detail, the user device 120A may transmit and receive messages via a wireless link with the macro cell base station 110A, the message including information related to various types of communication (e.g., voice, data, multimedia services, associated control signaling, etc.). The user device 120B may similarly communicate with the small cell base station 110B via another wireless link, and the user device 120C may similarly communicate with the small cell base station 110C via another wireless link. In addition, in some scenarios, the user device 120C, for example, may also communicate with the macro cell base station 110A via a separate wireless link in addition to the wireless link it maintains with the small cell base station 110C.

As is further illustrated in FIG. 1, the macro cell base station 110A may communicate with a corresponding wide area or external network 130, via a wired link or via a wireless link, while the small cell base stations 110B, 110C may also similarly communicate with the network 130, via their own wired or wireless links. For example, the small cell base stations 110B, 110C may communicate with the network 130 by way of an Internet Protocol (IP) connection, such as via a Digital Subscriber Line (DSL, e.g., including Asymmetric DSL (ADSL), High Data Rate DSL (HDSL), Very High Speed DSL (VDSL), etc.), a TV cable carrying IP traffic, a Broadband over Power Line (BPL) connection, an Optical Fiber (OF) cable, a satellite link, or some other link.

The network 130 may comprise any type of electronically connected group of computers and/or devices, including, for example, Internet, Intranet, Local Area Networks (LANs), or Wide Area Networks (WANs). In addition, the connectivity to the network may be, for example, by remote modem, Ethernet (IEEE 802.3), Token Ring (IEEE 802.5), Fiber Distributed Datalink Interface (FDDI) Asynchronous Transfer Mode (ATM), Wireless Ethernet (IEEE 802.11), Bluetooth (IEEE 802.15.1), or some other connection. As used herein, the network 130 includes network variations such as the public Internet, a private network within the Internet, a secure network within the Internet, a private network, a public network, a value-added network, an intranet, and the like. In certain systems, the network 130 may also comprise a Virtual Private Network (VPN).

Accordingly, it will be appreciated that the macro cell base station 110A and/or either or both of the small cell base stations 110B, 110C may be connected to the network 130 using any of a multitude of devices or methods. These connections may be referred to as the "backbone" or the "backhaul" of the network, and may in some implementations be used to manage and coordinate communications between the macro cell base station 110A, the small cell base station 110B, and/or the small cell base station 110C. In this way, as a user device moves through such a mixed communication network environment that provides both macro cell and small cell coverage, the user device may be served in certain locations by macro cell base stations, at other locations by small cell base stations, and, in some scenarios, by both macro cell and small cell base stations.

For their wireless air interfaces, each base station 110 may operate according to one of several RATs depending on the network in which it is deployed. These networks may include, for example, Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, and so on. The terms "network" and "system" are often used interchangeably. A CDMA network may implement a RAT such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a RAT such as Global System for Mobile Communications (GSM). An OFDMA network may implement a RAT such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is a release of UMTS that uses E-UTRA. UTRA, E-UTRA, GSM, UMTS, and LTE are described in documents from an organization named "3rd Generation Partnership Project" (3GPP). cdma2000 is described in documents from an organization named "3rd Generation Partnership Project 2" (3GPP2). These documents are publicly available.

For illustration purposes, an example downlink and uplink frame structure for an LTE signaling scheme is described below with reference to FIGS. 2-3.

Figure 2:
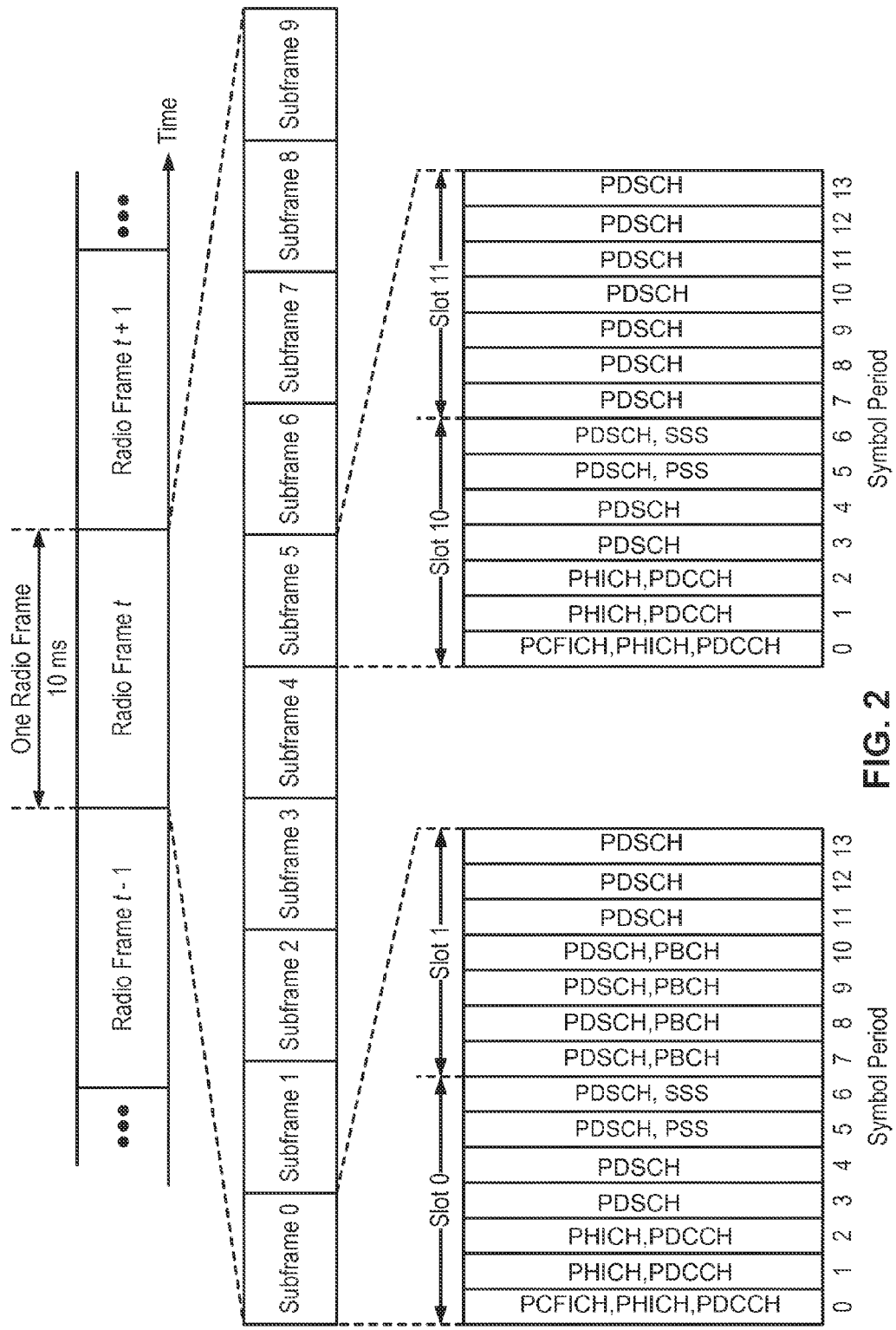
FIG. 2 is a block diagram illustrating an example downlink frame structure for LTE communications.

FIG. 2 is a block diagram illustrating an example downlink frame structure for LTE communications. In LTE, the base stations 110 of FIG. 1 are generally referred to as eNBs and the user devices 120 are generally referred to as UEs. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (as shown in FIG. 2) or 6 symbol periods for an extended cyclic prefix. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE, an eNB may send a Primary Synchronization Signal (PSS) and a Secondary Synchronization Signal (SSS) for each cell in the eNB. The PSS and SSS may be sent in symbol periods 5 and 6, respectively, in each of subframes 0 and 5 of each radio frame with the normal cyclic prefix, as shown in FIG. 2. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

Reference signals are transmitted during the first and fifth symbol periods of each slot when the normal cyclic prefix is used and during the first and fourth symbol periods when the extended cyclic prefix is used. For example, the eNB may send a Cell-specific Reference Signal (CRS) for each cell in the eNB on all component carriers. The CRS may be sent in symbols 0 and 4 of each slot in case of the normal cyclic prefix, and in symbols 0 and 3 of each slot in case of the extended cyclic prefix. The CRS may be used by UEs for coherent demodulation of physical channels, timing and frequency tracking, Radio Link Monitoring (RLM), Reference Signal Received Power (RSRP), and Reference Signal Received Quality (RSRQ) measurements, etc.

The eNB may send a Physical Control Format Indicator Channel (PCFICH) in the first symbol period of each subframe, as seen in FIG. 2. The PCFICH may convey the number of symbol periods (M) used for control channels, where M may be equal to 1, 2, or 3 and may change from subframe to subframe. M may also be equal to 4 for a small system bandwidth, e.g., with less than 10 resource blocks. In the example shown in FIG. 2, M=3. The eNB may send a Physical HARQ Indicator Channel (PHICH) and a Physical Downlink Control Channel (PDCCH) in the first M symbol periods of each subframe. The PDCCH and PHICH are also included in the first three symbol periods in the example shown in FIG. 2. The PHICH may carry information to support Hybrid Automatic Repeat Request (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The eNB may send the PSS, SSS, and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH, and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into Resource Element Groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1, and 2. The PDCCH may occupy 9, 18, 32, or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

Figure 3:
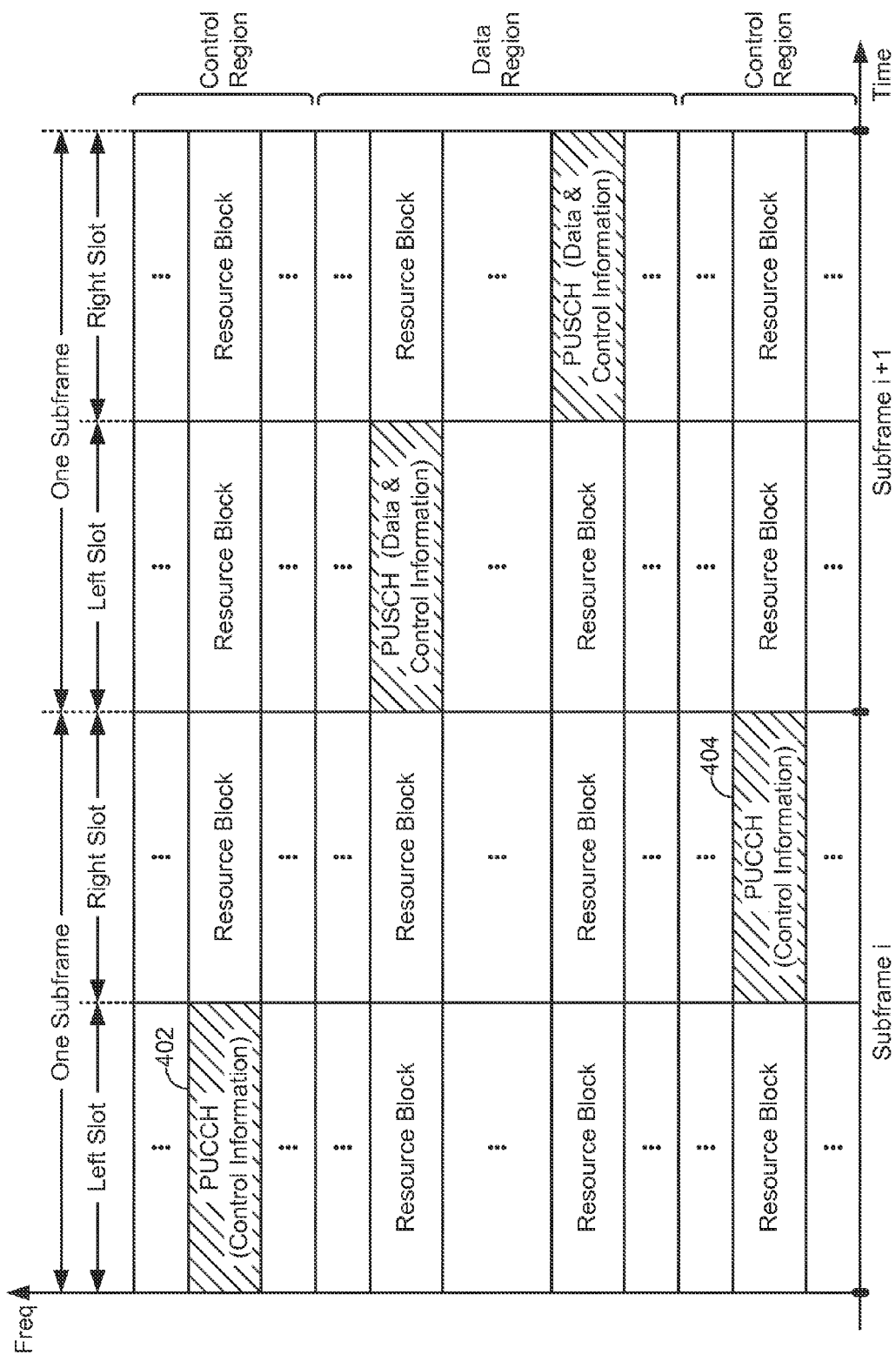
FIG. 3 is a block diagram illustrating an example uplink frame structure for LTE communications.

FIG. 3 is a block diagram illustrating an example uplink frame structure for LTE communications. The available resource blocks (which may be referred to as RBs) for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 3 results in the data section including contiguous subcarriers, which may allow a single UE to be assigned all of the contiguous subcarriers in the data section.

A UE may be assigned resource blocks in the control section to transmit control information to an eNB. The UE may also be assigned resource blocks in the data section to transmit data to the eNB. The UE may transmit control information in a Physical Uplink Control Channel (PUCCH) on the assigned resource blocks in the control section. The UE may transmit only data or both data and control information in a Physical Uplink Shared Channel (PUSCH) on the assigned resource blocks in the data section. An uplink transmission may span both slots of a subframe and may hop across frequency as shown in FIG. 3.

Returning to FIG. 1, cellular systems such as LTE are typically confined to one or more licensed frequency bands that have been reserved for such communications (e.g., by a government entity such as the Federal Communications Commission (FCC) in the United States). However, certain communication systems, in particular those employing small cell base stations as in the design of FIG. 1, have extended cellular operations into unlicensed frequency bands such as the Unlicensed National Information Infrastructure (U-NII) band used by Wireless Local Area Network (WLAN) technologies. For illustration purposes, the description below may refer in some respects to an LTE system operating on an unlicensed band by way of example when appropriate, although it will be appreciated that such descriptions are not intended to exclude other cellular communication technologies. LTE on an unlicensed band may also be referred to herein as LTE/LTE-Advanced in unlicensed spectrum, or simply LTE in the surrounding context. With reference to FIGS. 2-3 above, the PSS, SSS, CRS, PBCH, PUCCH, and PUSCH in LTE on an unlicensed band are otherwise the same or substantially the same as in the LTE standard described in 3GPP TS 36.211, entitled "Evolved Universal Terrestrial Radio Access (E-UTRA); Physical Channels and Modulation," which is publicly available.

The unlicensed spectrum may be employed by cellular systems in different ways. For example, in some systems, the unlicensed spectrum may be employed in a standalone configuration, with all carriers operating exclusively in an unlicensed portion of the wireless spectrum (e.g., LTE Standalone). In other systems, the unlicensed spectrum may be employed in a manner that is supplemental to licensed band operation by utilizing one or more unlicensed carriers operating in the unlicensed portion of the wireless spectrum in conjunction with an anchor licensed carrier operating in the licensed portion of the wireless spectrum (e.g., LTE Supplemental DownLink (SDL)). In either case, carrier aggregation may be employed to manage the different component carriers, with one carrier serving as the Primary Cell (PCell) for the corresponding user (e.g., an anchor licensed carrier in LTE SDL or a designated one of the unlicensed carriers in LTE Standalone) and the remaining carriers serving as respective Secondary Cells (SCells). In this way, the PCell may provide a Frequency Division Duplexed (FDD) pair of downlink and uplink carriers (licensed or unlicensed), with each SCell providing additional downlink capacity as desired.

The extension of small cell operation into unlicensed frequency bands such as the U-NII (5 GHz) band may therefore be implemented in a variety of ways and increase the capacity of cellular systems such as LTE. As discussed briefly in the background above, however, it may also encroach on the operations of other "native" RATs that typically utilize the same unlicensed band, most notably IEEE 802.11x WLAN technologies generally referred to as "Wi-Fi."

In some small cell base station designs, the small cell base station may include such a native RAT radio co-located with its cellular radio. According to various aspects described herein, the small cell base station may leverage the co-located radio to facilitate co-existence between the different RATs when operating on a shared unlicensed band. For example, the co-located radio may be used to conduct different measurements on the unlicensed band and dynamically determine the extent to which the unlicensed band is being utilized by devices operating in accordance with the native RAT. The cellular radio's use of the shared unlicensed band may then be specially adapted to balance the desire for efficient cellular operation against the need for stable co-existence.

Figure 4:
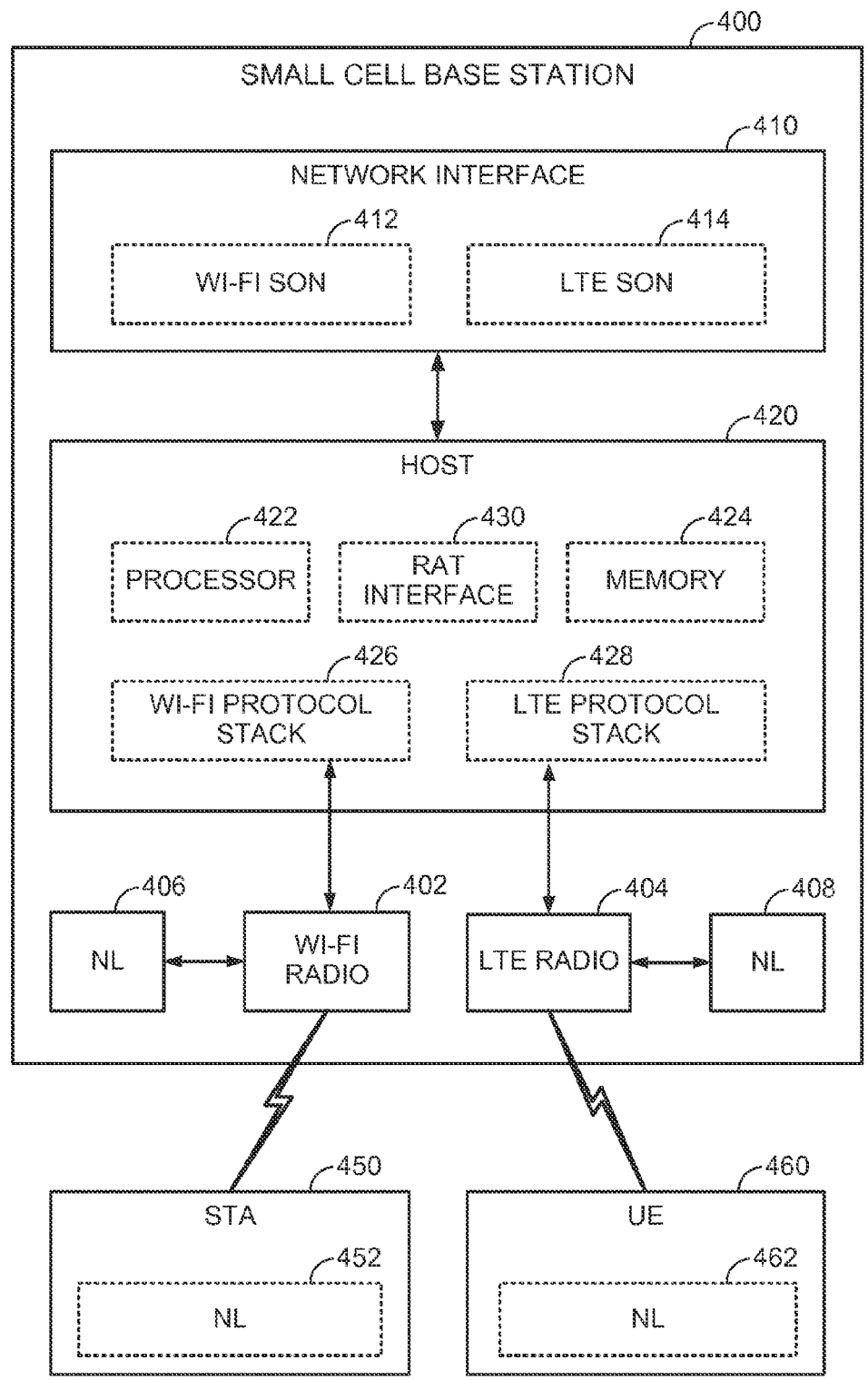
FIG. 4 illustrates an example small cell base station with co-located radio components (e.g., LTE and Wi-Fi) configured for unlicensed spectrum operation.

FIG. 4 illustrates an example small cell base station with co-located radio components configured for unlicensed spectrum operation. The small cell base station 400 may correspond, for example, to one of the small cell base stations 110B, 110C illustrated in FIG. 1. In this example, the small cell base station 400 is configured to provide a WLAN air interface (e.g., in accordance with an IEEE 802.11x protocol) in addition to a cellular air interface (e.g., in accordance with an LTE protocol). For illustration purposes, the small cell base station 400 is shown as including an 802.11x radio component/module (e.g., transceiver) 402 co-located with an LTE radio component/module (e.g., transceiver) 404.

As used herein, the term co-located (e.g., radios, base stations, transceivers, etc.) may include in accordance with various aspects, one or more of, for example: components that are in the same housing; components that are hosted by the same processor; components that are within a defined distance of one another; and/or components that are connected via an interface (e.g., an Ethernet switch) where the interface meets the latency requirements of any required inter-component communication (e.g., messaging). In some designs, the advantages discussed herein may be achieved by adding a radio component of the native unlicensed band RAT of interest to a given cellular small cell base station without that base station necessarily providing corresponding communication access via the native unlicensed band RAT (e.g., adding a Wi-Fi chip or similar circuitry to an LTE small cell base station). If desired, a low functionality Wi-Fi circuit may be employed to reduce costs (e.g., a Wi-Fi receiver simply providing low-level sniffing).

Returning to FIG. 4, the Wi-Fi radio 402 and the LTE radio 404 may perform monitoring of one or more channels (e.g., on a corresponding carrier frequency) to perform various corresponding operating channel or environment measurements (e.g., CQI, RSSI, RSRP, or other RLM measurements) using corresponding Network/Neighbor Listen (NL) modules 406 and 408, respectively, or any other suitable component(s).

The small cell base station 400 may communicate with one or more user devices via the Wi-Fi radio 402 and the LTE radio 404, illustrated as an STA 450 and a UE 460, respectively. Similar to the Wi-Fi radio 402 and the LTE radio 404, the STA 450 includes a corresponding NL module 452 and the UE 460 includes a corresponding NL module 462 for performing various operating channel or environment measurements, either independently or under the direction of the Wi-Fi radio 402 and the LTE radio 404, respectively. In this regard, the measurements may be retained at the STA 450 and/or the UE 460, or reported to the Wi-Fi radio 402 and the LTE radio 404, respectively, with or without any pre-processing being performed by the STA 450 or the UE 460.

While FIG. 4 shows a single STA 450 and a single UE 460 for illustration purposes, it will be appreciated that the small cell base station 400 can communicate with multiple STAs and/or UEs. Additionally, while FIG. 4 illustrates one type of user device communicating with the small cell base station 400 via the Wi-Fi radio 402 (i.e., the STA 450) and another type of user device communicating with the small cell base station 400 via the LTE radio 404 (i.e., the UE 460), it will be appreciated that a single user device (e.g., a smartphone) may be capable of communicating with the small cell base station 400 via both the Wi-Fi radio 402 and the LTE radio 404, either simultaneously or at different times.

As is further illustrated in FIG. 4, the small cell base station 400 may also include a network interface 410, which may include various components for interfacing with corresponding network entities (e.g., Self-Organizing Network (SON) nodes), such as a component for interfacing with a Wi-Fi SON 412 and/or a component for interfacing with an LTE SON 414. The small cell base station 400 may also include a host 420, which may include one or more general purpose controllers or processors 422 and memory 424 configured to store related data and/or instructions. The host 420 may perform processing in accordance with the appropriate RAT(s) used for communication (e.g., via a Wi-Fi protocol stack 426 and/or an LTE protocol stack 428), as well as other functions for the small cell base station 400. In particular, the host 420 may further include a RAT interface 430 (e.g., a bus or the like) that enables the radios 402 and 404 to communicate with one another via various message exchanges.

Figure 5:
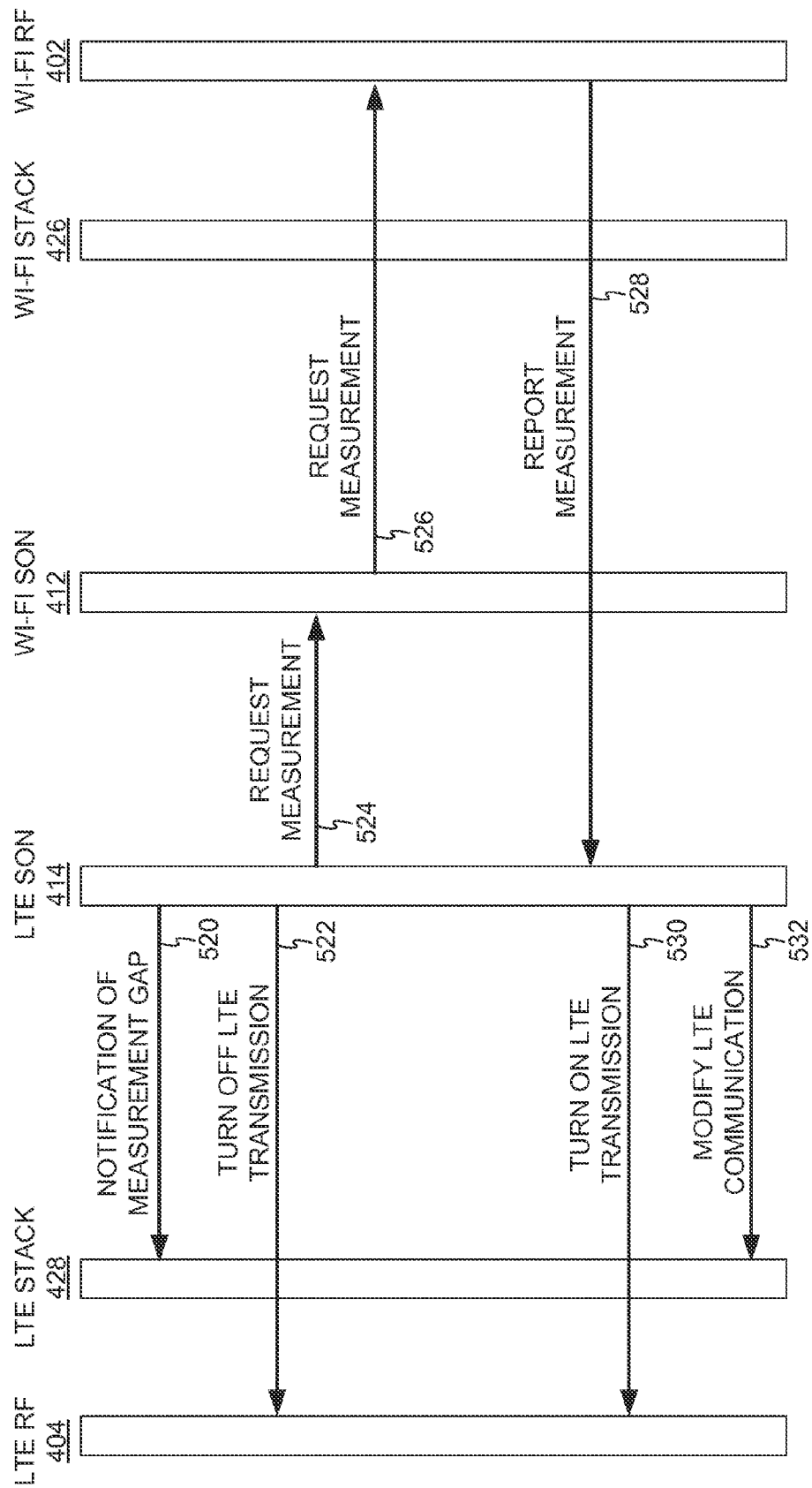
FIG. 5 is a signaling flow diagram illustrating an example message exchange between co-located radios.

FIG. 5 is a signaling flow diagram illustrating an example message exchange between co-located radios. In this example, one RAT (e.g., LTE) requests a measurement from another RAT (e.g., Wi-Fi) and opportunistically ceases transmission for the measurement. FIG. 5 will be explained below with continued reference to FIG. 4.

Initially, the LTE SON 414 notifies the LTE stack 428 via a message 520 that a measurement gap is upcoming on the shared unlicensed band. The LTE SON 414 then sends a command 522 to cause the LTE radio (RF) 404 to temporarily turn off transmission on the unlicensed band, in response to which the LTE radio 404 disables the appropriate RF components for a period of time (e.g., so as to not interfere with any measurements during this time).

The LTE SON 414 also sends a message 524 to the co-located Wi-Fi SON 412 requesting that a measurement be taken on the unlicensed band. In response, the Wi-Fi SON 412 sends a corresponding request 526 via the Wi-Fi stack 426 to the Wi-Fi radio 402, or some other suitable Wi-Fi radio component (e.g., a low cost, reduced functionality Wi-Fi receiver).

After the Wi-Fi radio 402 conducts measurements for Wi-Fi related signaling on the unlicensed band, a report 528 including the results of the measurements is sent to the LTE SON 414 via the Wi-Fi stack 426 and the Wi-Fi SON 412. In some instances, the measurement report may include not only measurements performed by the Wi-Fi radio 402 itself, but also measurements collected by the Wi-Fi radio 402 from the STA 450. The LTE SON 414 may then send a command 530 to cause the LTE radio 404 to turn back on transmission on the unlicensed band (e.g., at the end of the defined period of time).

The information included in the measurement report (e.g., information indicative of how Wi-Fi devices are utilizing the unlicensed band) may be compiled along with various LTE measurements and measurement reports. Based on information about the current operating conditions on the shared unlicensed band (e.g., as collected by one or a combination of the Wi-Fi radio 402, the LTE radio 404, the STA 450, and/or the UE 460), the small cell base station 400 may specially adapt different aspects of its cellular operations in order to manage co-existence between the different RATs. Returning to FIG. 5, the LTE SON 414, for example, may then send a message 532 that informs the LTE stack 428 how LTE communication is to be modified.

There are several aspects of cellular operation that may be adapted in order to manage co-existence between the different RATs. For example, the small cell base station 400 may select certain carriers as preferable when operating in the unlicensed band, may opportunistically enable or disable operation on those carriers, may selectively adjust the transmission power of those carriers, if necessary (e.g., periodically or intermittently in accordance with a transmission pattern), and/or take other steps to balance the desire for efficient cellular operation against the need for stable co-existence.

Figure 6:
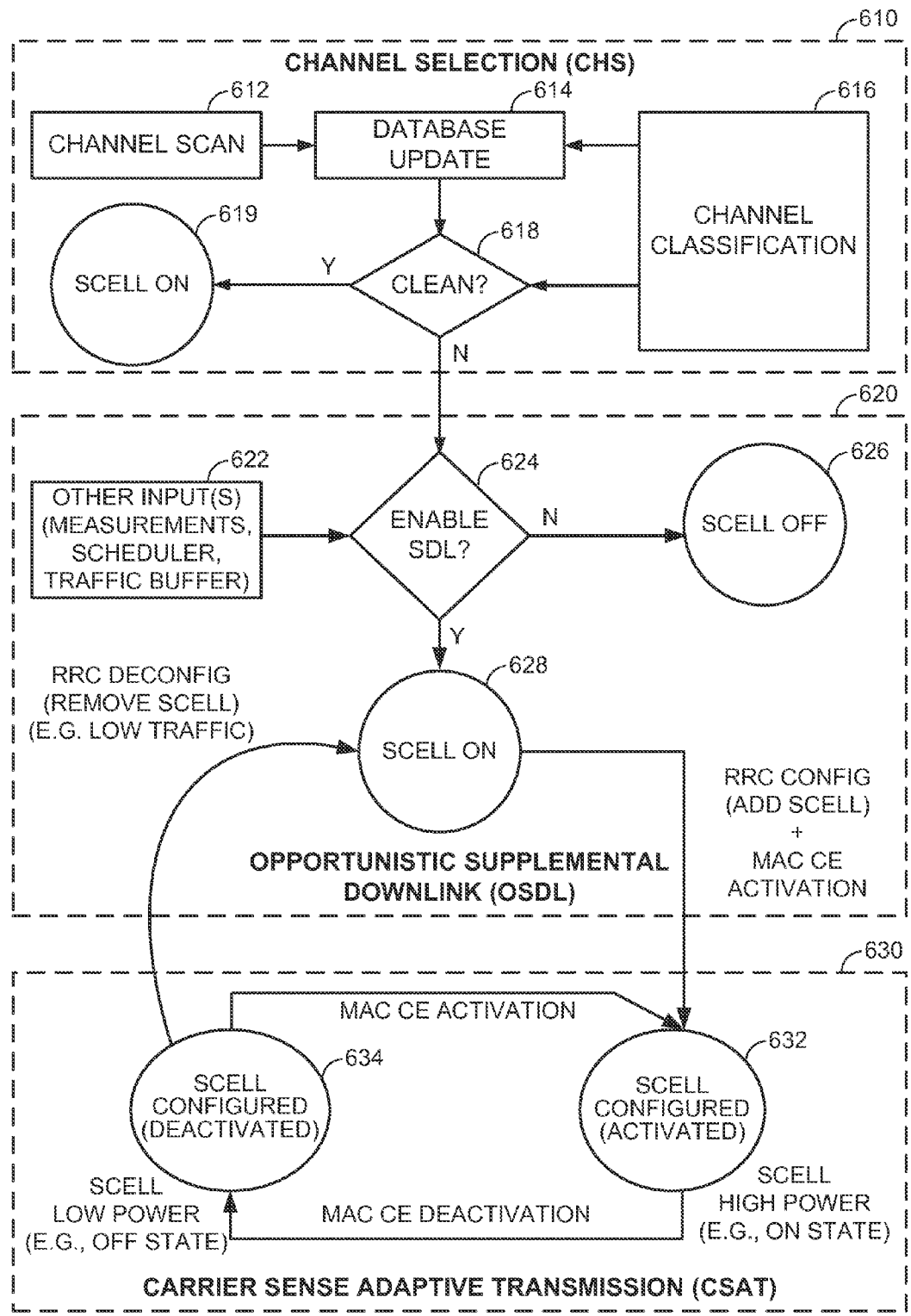
FIG. 6 is a system-level co-existence state diagram illustrating different aspects of cellular operation that may be specially adapted to manage co-existence between different RATs operating on a shared unlicensed band.

FIG. 6 is a system-level co-existence state diagram illustrating different aspects of cellular operation that may be specially adapted to manage co-existence between different RATs operating on a shared unlicensed band. As shown, the techniques in this example include operations that will be referred to herein as Channel Selection (CHS) where appropriate unlicensed carriers are analyzed, Opportunistic Supplemental Downlink (OSDL) where operation on one or more corresponding SCells is configured or deconfigured, and Carrier Sense Adaptive Transmission (CSAT) where the transmission power on those SCells is adapted, if necessary, by cycling between periods of high transmission power (e.g., an ON state, as a special case) and low transmission power (e.g., an OFF state, as a special case).

For CHS (block 610), a channel selection algorithm may perform certain periodic or event-driven scanning procedures (e.g., initial or threshold triggered) (block 612). With reference to FIG. 4, the scanning procedures may utilize, for example, one or a combination of the Wi-Fi radio 402, the LTE radio 404, the STA 450, and/or the UE 460. The scan results may be stored (e.g., over a sliding time window) in a corresponding database (block 614) and used to classify the different channels in terms of their potential for cellular operation (block 616). For example, a given channel may be classified, at least in part, based on whether it is a clean channel or whether it will need to be afforded some level of protection for co-channel communications. Various cost functions and associated metrics may be employed in the classification and related calculations.

If a clean channel is identified ('yes' at decision 618), a corresponding SCell may be operated without concern for impacting co-channel communications (state 619). On the other hand, if no clean channel is identified, further processing may be utilized to reduce the impact on co-channel communications ('no' at decision 618), as described below.

Turning to OSDL (block 620), input may be received from the channel selection algorithm as well as from other sources, such as various measurements, schedulers, traffic buffers, etc. (block 622), to determine whether unlicensed operation is warranted without a clean channel being available (decision 624). For example, if there is not enough traffic to support a secondary carrier in the unlicensed band ('no' at decision 624), the corresponding SCell that supports it may be disabled (state 626). Conversely, if there is a substantial amount of traffic ('yes' at decision 624), even though a clean channel is not available, an SCell may nevertheless be constructed from one or more of the remaining carriers by invoking CSAT operation (block 630) to mitigate the potential impact on co-existence.

Returning to FIG. 6, the SCell may be initially enabled (e.g., in a deconfigured state) (state 628). The SCell along with one or more corresponding user devices may then be configured and activated (state 630) for normal operation. In LTE, for example, an associated UE may be configured and deconfigured via corresponding RRC Config/Deconfig messages to add the SCell to its active set. Activation and deactivation of the associated UE may be performed, for example, by using Medium Access Control (MAC) Control Element (CE) Activation/Deactivation commands. At a later time, when the traffic level drops below a threshold, for example, an RRC Deconfig message may be used to remove the SCell from the UE's active set, and return the system to the deconfigured state (state 628). If all UEs are deconfigured, OSDL may be invoked to turn the SCell off.

During CSAT operation (block 630), the SCell may remain configured but be cycled between periods of activated operation (state 632) and periods of deactivated operation (state 634) in accordance with a (long-term) Time Division Multiplexed (TDM) communication pattern. In the configured/activated state (state 632), the SCell may operate at relatively high power (e.g., full powered ON state). In the configured/deactivated state (state 634), the SCell may operate at a reduced, relatively low power (e.g., depowered OFF state).

Figure 7:
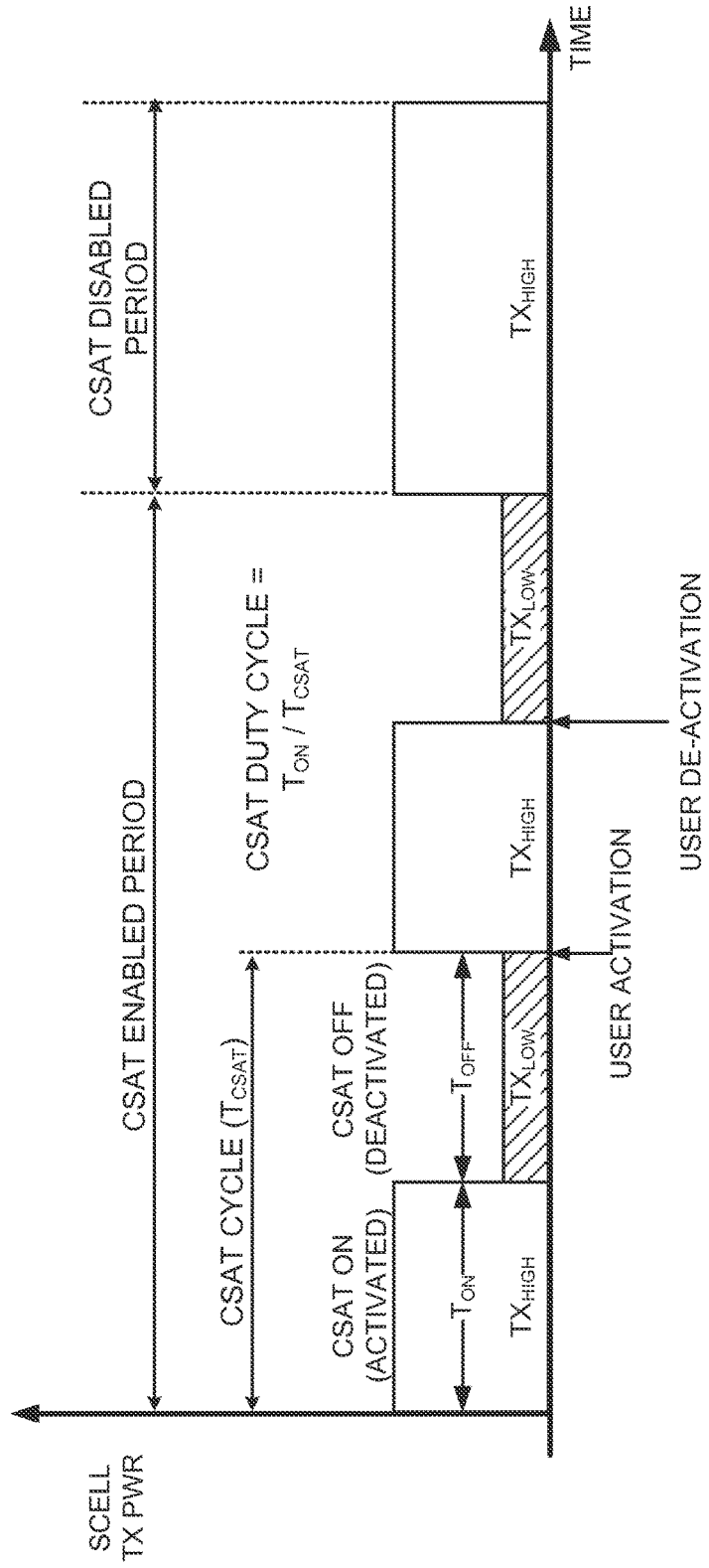
FIG. 7 illustrates in more detail certain aspects of a Carrier Sense Adaptive Transmission (CSAT) communication scheme for cycling cellular operation in accordance with a long-term Time Division Multiplexed (TDM) communication pattern.

FIG. 7 illustrates in more detail certain aspects of a CSAT communication scheme for cycling cellular operation in accordance with a long-term TDM communication pattern. As discussed above in relation to FIG. 6, CSAT may be selectively enabled on one or more SCells as appropriate to facilitate co-existence in unlicensed spectrum, even when a clean channel free of competing RAT operation is not available.

When enabled, SCell operation is cycled between CSAT ON (activated) periods and CSAT OFF (deactivated) periods within a given CSAT cycle ($T_{CSAT}$). One or more associated user devices may be similarly cycled between corresponding MAC activated and MAC deactivated periods. During an associated activated period of time $T_{ON}$, SCell transmission on the unlicensed band may proceed at a normal, relatively high transmission power. During an associated deactivated period of time $T_{OFF}$, however, the SCell remains in a configured state but transmission on the unlicensed band is reduced or even fully disabled to yield the medium to a competing RAT (as well as to perform various measurements via a co-located radio of the competing RAT).

Each of the associated CSAT parameters, including, for example, the CSAT pattern duty cycle (i.e., $T_{ON}/T_{CSAT}$) and the relative transmission powers during activated/deactivated periods, may be adapted based on the current signaling conditions to optimize CSAT operation. As an example, if the utilization of a given channel by Wi-Fi devices is high, an LTE radio may adjust one or more of the CSAT parameters such that usage of the channel by the LTE radio is reduced. For example, the LTE radio may reduce its transmit duty cycle or transmit power on the channel. Conversely, if utilization of a given channel by Wi-Fi devices is low, an LTE radio may adjust one or more of the CSAT parameters such that usage of the channel by the LTE radio is increased. For example, the LTE radio may increase its transmit duty cycle or transmit power on the channel. In either case, the CSAT ON (activated) periods may be made sufficiently long (e.g., greater than or equal to about 200 msec) to provide user devices with a sufficient opportunity to perform at least one measurement during each CSAT ON (activated) period.

A CSAT scheme as provided herein may offer several advantages for mixed RAT co-existence, particularly in unlicensed spectrum. For example, by adapting communication based on signals associated with a first RAT (e.g., Wi-Fi), a second RAT (e.g., LTE) may react to utilization of a co-channel by devices that use the first RAT while refraining from reacting to extraneous interference by other devices (e.g., non-Wi-Fi devices) or adjacent channels. As another example, a CSAT scheme enables a device that uses one RAT to control how much protection is to be afforded to co-channel communications by devices that use another RAT by adjusting the particular parameters employed. In addition, such a scheme may be generally implemented without changes to the underlying RAT communication protocol. In an LTE system, for example, CSAT may be generally implemented without changing the LTE PHY or MAC layer protocols, but by simply changing the LTE software.

To improve overall system efficiency, the CSAT cycle may be synchronized, in whole or in part, across different small cells, at least within a given operator. For example, the operator may set a minimum CSAT ON (activated) period ($T_{ON,min}$) and a minimum CSAT OFF (deactivated) period ($T_{OFF,min}$). Accordingly, the CSAT ON (activated) period durations and transmission powers may be different, but minimum deactivation times and certain channel selection measurement gaps may be synchronized.

It may be advantageous to synchronize certain user devices with the CSAT cycling parameters by using the predefined MAC CE Activation/Deactivation commands provided in LTE for SCell activation and deactivation operations. The Activation/Deactivation MAC CE in LTE is described in 3GPP TS 36.321, entitled "Evolved Universal Terrestrial Radio Access (E-UTRA); Medium Access Control (MAC) Protocol," which is publicly available. Without synchronization, a user device may attempt to perform various measurements during the CSAT OFF time but will not be able to find the small cell base station during this time. Such user device measurements include Carrier-to-Interference (C/I) measurements, Reference Signal Received Power (RSRP) measurements, Reference Signal Received Quality (RSRQ) measurements, and Channel Quality Indicator (CQI) measurements, which are based on signals (e.g., CRS) that the small cell base station may not be transmitting during the CSAT OFF period. This may impact measurement and timing accuracy, tracking loop procedures, cell reselection procedures, etc., and detrimentally affect proper operation of the system. Further, although new signaling protocols and associated messages may be created to notify a user device of the CSAT cycling parameters (e.g., new special-purpose MAC CE messages), legacy devices may not support or be able to interpret these new messages. Accordingly, the use of predefined MAC CE Activation/Deactivation commands may be advantageous in several respects.

To further enhance system efficiency, the user devices may be activated in a certain activation order based on their respective link qualities, such that user devices with poorer link qualities may be given more time to ramp up different parameter estimation loops. Conversely, the user devices may be scheduled for data transmissions in a reverse order to activation, such that user devices with poorer link qualities will be given still more time to ramp up before it is their turn to receive data. For some user devices, it may be advantageous to additionally utilize Radio Resource Control (RRC) connection messages in addition to MAC CE commands to configure/deconfigure a given SCell during CSAT ON (activated) and CSAT OFF (deactivated) periods.

Figure 8:
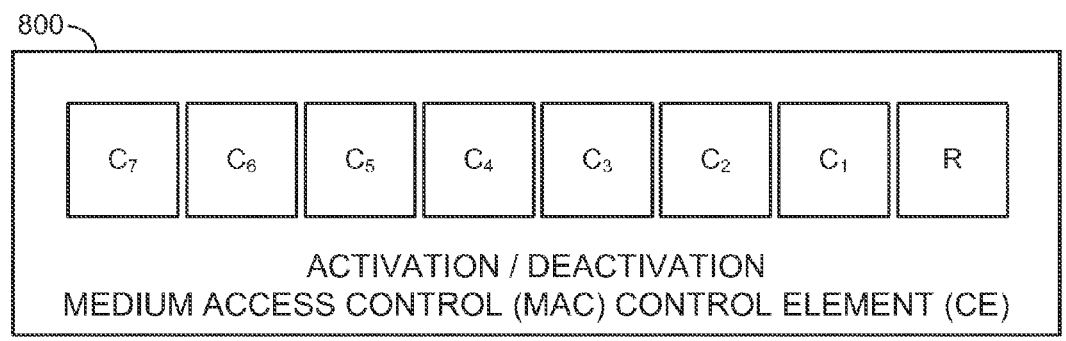
FIG. 8 illustrates an example Long Term Evolution (LTE) Activation/Deactivation Medium Access Control (MAC) Control Element (CE) that may be repurposed to activate and deactivate certain user devices in accordance with various CSAT cycling parameters.

FIG. 8 illustrates an example LTE Activation/Deactivation MAC CE that may be repurposed to activate and deactivate certain user devices in accordance with various CSAT cycling parameters. The Activation/Deactivation MAC CE is typically identified by a MAC Packet Data Unit (PDU) subheader with Logical Channel Identifier (LCID) set to '11011'. It typically has a fixed size and consists of a single octet containing seven C-fields and one R-field.

In particular, the Activation/Deactivation MAC CE 800 includes several SCellIndex fields ($C_i$: $C_1$-$C_7$) and a Reserved bit (R), as shown. Each SCellIndex field indicates the activation/deactivation status of the SCell with SCellIndex i. Each SCellIndex field may be set to '1' to indicate that the SCell with SCellIndex i is to be activated. Each SCellIndex field may be set to '0' to indicate that the SCell with SCellIndex i is to be deactivated. The Reserved bit may be set to '0'.

Figure 9:
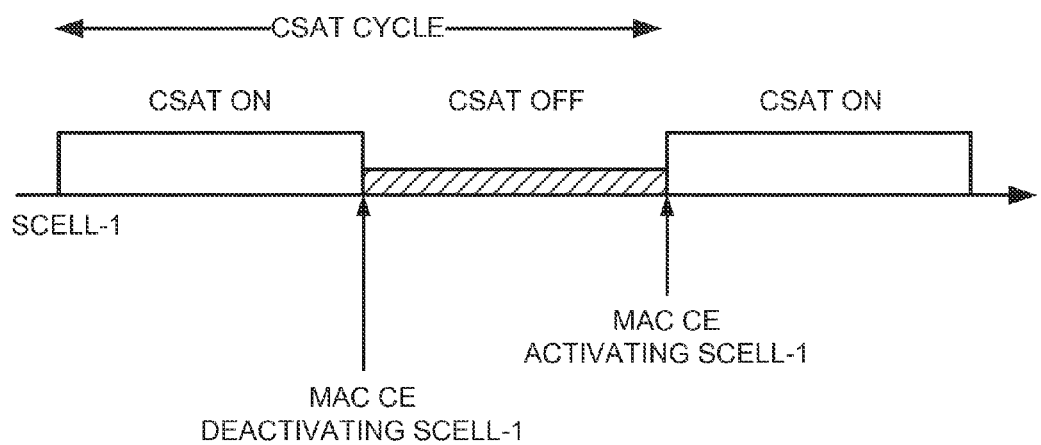
FIG. 9 illustrates a CSAT communication scheme utilizing the Activation/Deactivation MAC CEs of FIG. 8.

FIG. 9 illustrates a CSAT communication scheme utilizing the Activation/Deactivation MAC CEs of FIG. 8. As in FIG. 7, during CSAT ON (activated) periods of communication, transmission on the unlicensed RF band is enabled. During CSAT OFF (deactivated) periods, transmission on the unlicensed RF band is disabled to allow other-system operations and to conduct measurements.

In this example, a given SCell ("SCell-1") is operated in a CSAT communication mode. In preparation for a CSAT OFF (deactivated) period, a first Activation/Deactivation MAC CE is transmitted to a corresponding user device that indicates a deactivated status for SCell-1. In preparation for a CSAT ON (activated) period, a second Activation/Deactivation MAC CE is transmitted to a corresponding user device that indicates an activated status for SCell-1. For simplicity in the description below, an Activation/Deactivation MAC CE activating a given SCell may simply be referred to MAC CE "activation" whereas an Activation/Deactivation MAC CE deactivating a given SCell may simply be referred to as a MAC CE "deactivation."

Figure 10:
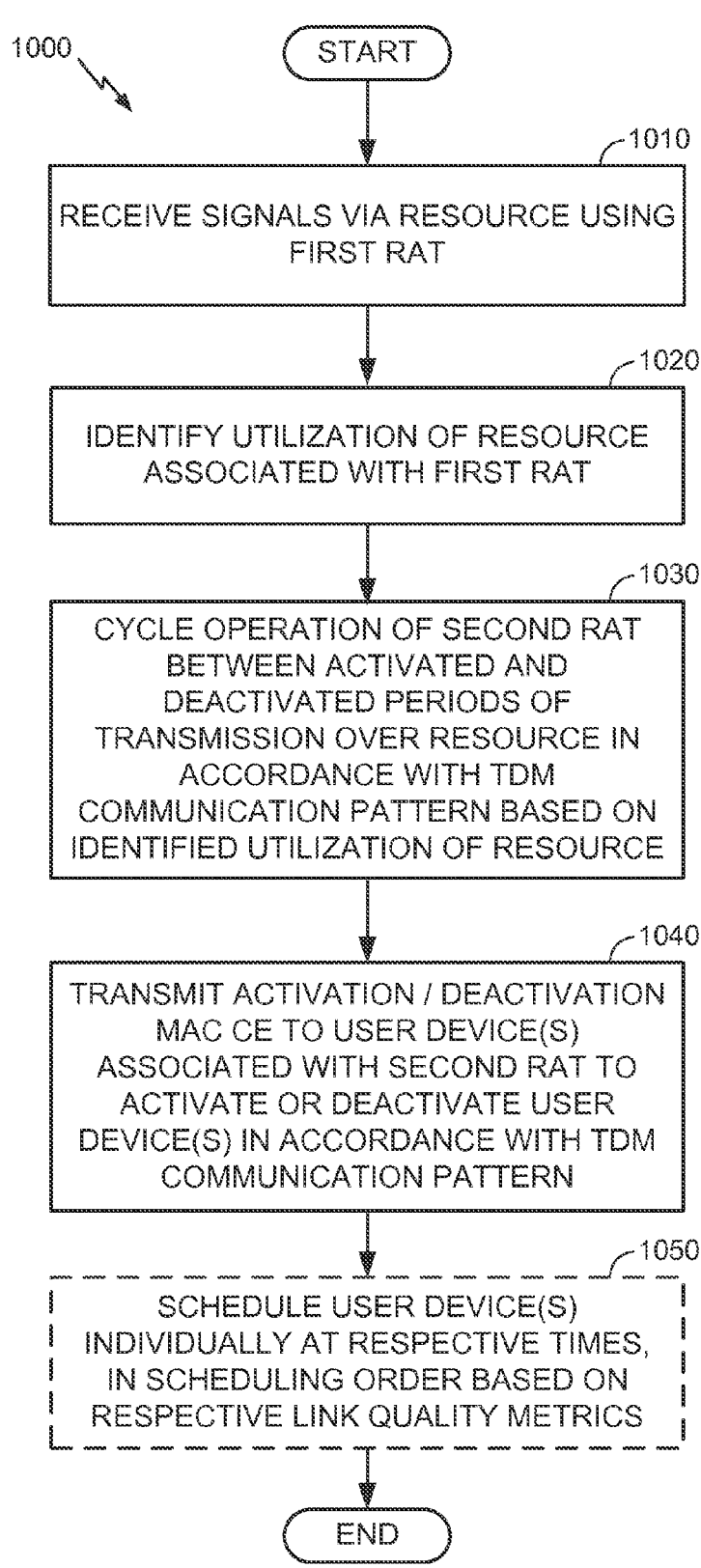
FIG. 10 is a flow diagram illustrating an example method of coordinating CSAT communication for reducing interference between RATs by utilizing Activation/Deactivation MAC CEs.

FIG. 10 is a flow diagram illustrating an example method of coordinating CSAT communication for reducing interference between RATs by utilizing Activation/Deactivation MAC CEs. The method may be performed, for example, by a small cell base station (e.g., the small cell base station 110B illustrated in FIG. 1).

As shown, the method 1000 may include the small cell base station receiving signals via a resource using a first (e.g., Wi-Fi) RAT (block 1010). The resource may be an unlicensed radio frequency band shared by Wi-Fi and LTE devices, for example. The small cell base station may then identify utilization of the resource associated with the first RAT based on the received signals (block 1020). Utilization of the resource may give an indication of an amount of interference (e.g., co-channel interference) that is associated with first RAT signaling.

In response, the small cell base station may enter a CSAT communication mode by cycling operation of a second RAT (e.g., LTE) between activated and deactivated periods of transmission over the resource in accordance with a TDM communication pattern, which may be adapted based on the identified utilization of the resource (block 1030) in accordance with the CSAT procedures described herein. In order to synchronize user device operation with the CSAT communication scheme, the small cell base station may also transmit an Activation/Deactivation MAC CE to one or more user devices associated with the second RAT to activate or deactivate each of the user devices in accordance with the TDM communication pattern (block 1040).

For example, with reference to FIG. 7, the small cell base station can use a first MAC CE to deactivate a given user device before the start of a CSAT OFF (deactivated) period, ensuring that the user device does not attempt to monitor certain signaling (e.g., CRS) from the small cell base station when the small cell base station is not transmitting. The small cell base station may then use a second MAC CE to activate the user device at the start of a CSAT ON (activated) period, ensuring that the user device starts to again monitor the signaling when the small cell base station resumes transmission.

To enhance system efficiency, the MAC CE may be transmitted to each of the user devices individually at respective times, in an activation order based on respective link quality metrics (e.g., SNR/SINR). For example, the activation order may prioritize activation of user devices having lower link quality metrics as compared to user devices having higher link quality metrics. In this way, user devices with low SNR/SINR or otherwise poor link quality may be activated first, followed by user devices with better link quality. This will provide user devices with poor link quality more time to ramp up different parameter estimation loops, for example.

Returning to FIG. 10, as a further enhancement, advanced user device scheduling (for data transmission) may be performed to mitigate potential delays introduced by the activation/deactivation procedures. Each of the user devices may accordingly be scheduled individually at respective times, in a scheduling order based on respective link quality metrics (optional block 1050). The scheduling order may prioritize scheduling grants to user devices having higher link quality metrics as compared to user devices having lower link quality metrics. By scheduling user devices in the reverse order in which they are activated, the user devices with poor link quality may be afforded even more time (e.g., a few subframes) to ramp up, leading to an effective ramp-up time for the system as a whole that is more closely aligned with the fastest ramp-up user devices rather than limited by the slowest ramp-up user devices.

Different Modulation and Coding Schemes (MCSs) for each of the user devices may be specified upon reactivation. When selecting an MCS, however, there may not be sufficient CQI data for the preceding CSAT OFF (deactivated) period since the small cell base station was not transmitting during this period. Accordingly, the initial MCS may be selected based on a last available valid CQI for the user device, as well as a certain backoff factor accounting for uncertainty during the CSAT OFF (deactivated) period. The backoff factor may be fixed or adaptive. For example, the backoff factor may be a function of user device link quality and the scheduling grant time after reactivation.

Additional coordination operations may be performed in certain instances to further ensure synchronized operation of user devices with the CSAT communication scheme. For some user devices, it may be desirable to use RRC connection messages to control activation and deactivation at a higher level. For example, certain user devices may still monitor one or more SCells provided by the small cell base station during CSAT OFF (deactivated) periods. If this happens, different user device loops can be impacted since the small cell base station is not transmitting and the user device will be effectively monitoring noise. With reference to FIG. 6, to prevent such user devices from monitoring a given SCell during CSAT OFF (deactivated) periods, an RRC deconfiguration message may be used to remove the SCell from the set of serving cells for the user device. This prevents the user device from monitoring the SCell, but also requires the small cell base station to add the SCell back to the set of serving cells for the user device though another RRC message upon powering back up and wait for activation. Thus, conventional RRC messages used on their own for CSAT coordination may introduce extra overhead.

To address this problem, the small cell base station may be configured to start with using MAC CE activation as described above, but transition any poor performing user devices to RRC configuration followed by activation as needed.

Figure 11:
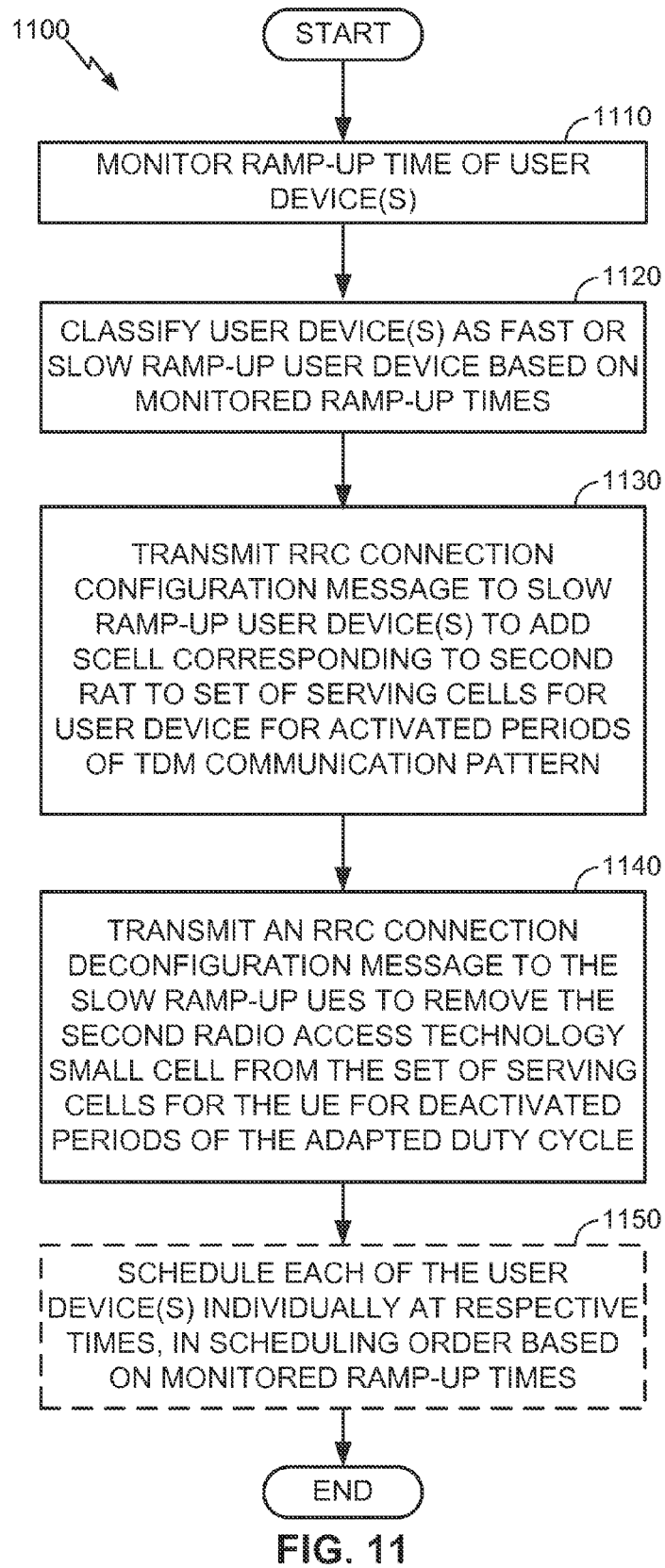
FIG. 11 is a flow diagram illustrating an example method of coordinating CSAT communication for reducing interference between RATs by utilizing RRC connection configuration messaging.

FIG. 11 is a flow diagram illustrating an example method of coordinating CSAT communication for reducing interference between RATs by utilizing RRC connection configuration messaging. The method may again be performed by the small cell base station (e.g., the small cell base station 110B illustrated in FIG. 1), and may operate in conjunction with the procedure in FIG. 10.

As shown, the method 1100 may include the small cell base station monitoring ramp-up time of each user device (block 1110). Ramp-up time may be monitored, for example, based on CQI reports from each user device after activation, which may be requested (aperiodically) as appropriate. Based on the monitored ramp-up times, the small cell base station may classify the user devices as fast or slow ramp-up user devices (e.g., as compared to a threshold) (block 1120). If user device ramp-up time is sufficiently fast, the small cell base station can continue to use MAC CE activation with the user device. If, however, the small cell base station finds the user device reporting a CQI of '0' or some other low CQI value, for example, the small cell base station may use RRC configuration followed by activation for the user device in future activation/deactivation periods.

More specifically, the small cell base station may transmit an RRC connection configuration message to slow ramp-up user devices to add an SCell corresponding to the second (e.g., LTE) RAT provided by the small cell base station to the set of serving cells for the user device for activated periods of the TDM communication pattern (block 1130), and transmit an RRC connection deconfiguration message to the slow ramp-up user devices to remove the SCell from the set of serving cells for the user device for deactivated periods of the TDM communication pattern (block 1140).

For corresponding data scheduling, the small cell base station may schedule each of the user devices individually at respective times, in a scheduling order based on the monitored ramp-up times (optional block 1150). The scheduling order may prioritize, for example, scheduling grants to user devices having faster ramp-up times as compared to user devices having slower ramp-up times. In this way, if the SCell has a mix of both user device classes, the small cell base station can initially only schedule data for the better performing user devices (where MAC activation is enough and they have a fast ramp-up time), and later start to schedule data for the user devices that have longer ramp-up times (which will benefit from RRC configuration and deconfiguration). This makes the warm-up overhead bounded by the best performing user device on the SCell rather than the worst performing user device.

Other enhancements to activation, deactivation, and other aspects of the CSAT communication scheme may be applied as well, in addition or as an alternative to the techniques above.

Figure 12:
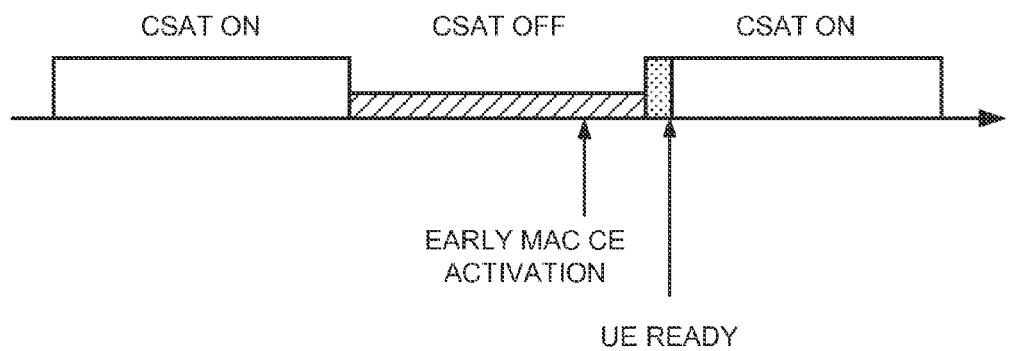
FIGS. 12-14 illustrate further aspects of CSAT communication coordination.
Figure 13:
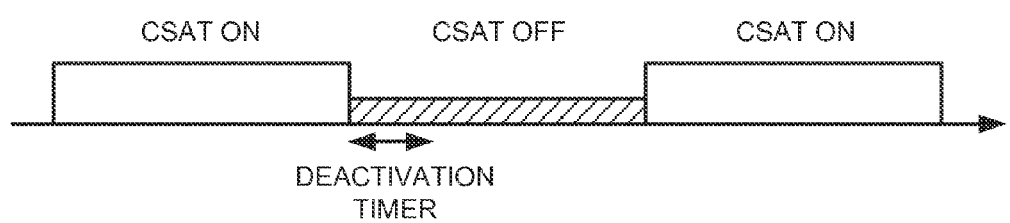
Figure 14:
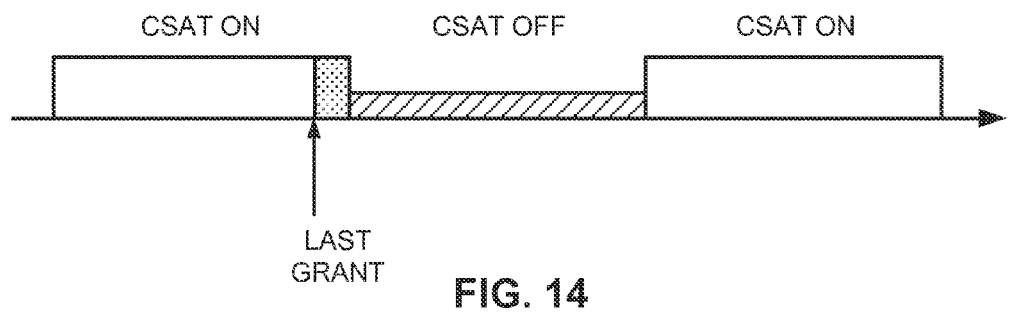

FIGS. 12-14 illustrate further aspects of CSAT communication coordination. As in FIG. 7, during CSAT ON (activated) periods of communication, transmission on the unlicensed RF band is enabled. During CSAT OFF (deactivated) periods, transmission on the unlicensed RF band is disabled to allow other-system operations and to conduct measurements.

As shown in FIG. 12, in some designs, the MAC CE activation may be sent early in accordance with an activation margin, such as a few milliseconds before the start of the activated period (e.g. 2-3 msec). This may help to provide a buffer against the processing delay required for the user device to decode the MAC CE, to set Automatic Gain Control (AGC), Firmware (FW) processes, etc., such that the user device will be ready at or near the start time for the CSAT ON (activated) period. The activation margin may be fixed for all user devices or adaptive on an individual user device basis.

As shown in FIG. 13, in some designs, deactivation of the user device may be performed in accordance with a deactivation timer (e.g., SCellDeactivationTimer) rather than a separate MAC CE deactivation message. At the end of the SCellDeactivationTimer period (as configured by the small cell base station), if the user device does not receive any data, it will automatically enter a deactivation state. Once deactivated, the user device will reset most of its processing loops (e.g., channel estimation, etc.). The SCellDeactivationTimer period may be fixed for all user devices or adaptive on an individual user device basis.

As shown in FIG. 14, in some designs, in order to provide adequate time for any retransmissions before deactivation, the small cell base station may stop scheduling grants in advance of the end of the CSAT ON (activated) period (e.g., by some predetermined guard duration, $T_{guard}$, on the order of a few msec). This avoids having to use Radio Link Control (RLC) procedures to handle any HARQ retransmissions in the CSAT OFF (deactivated) period. Alternatively, grants near the end of the CSAT ON (activated) period may be scheduled with a conservative, low MCS to ensure proper delivery in the first instance, alleviating the need for retransmissions.

Figure 15:
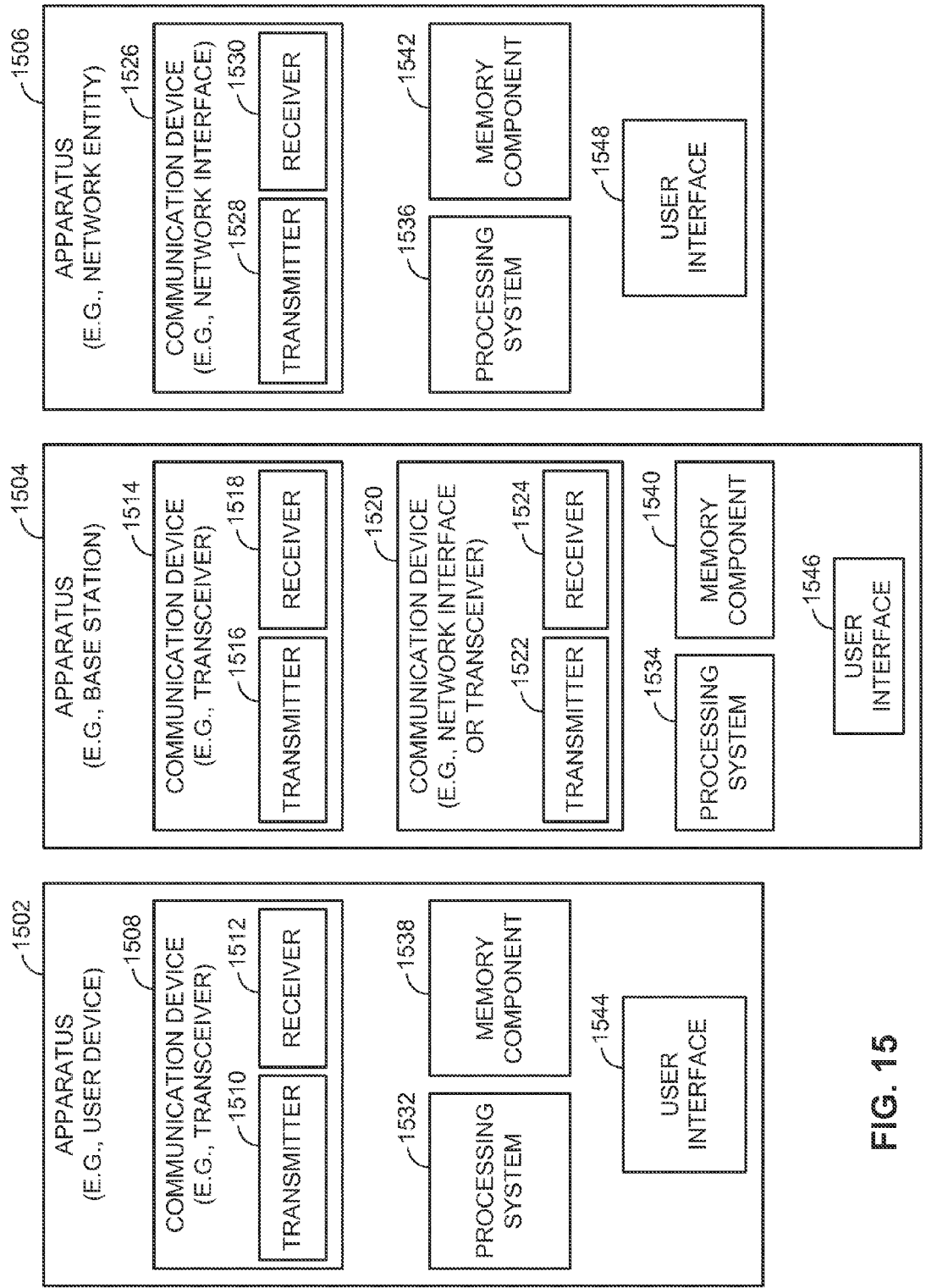
FIG. 15 is a simplified block diagram of several sample aspects of components that may be employed in communication nodes and configured to support communication as taught herein.

FIG. 15 illustrates several sample components (represented by corresponding blocks) that may be incorporated into an apparatus 1502, an apparatus 1504, and an apparatus 1506 (corresponding to, for example, a user device, a base station, and a network entity, respectively) to support the CSAT coordination operations as taught herein. It will be appreciated that these components may be implemented in different types of apparatuses in different implementations (e.g., in an ASIC, in an SoC, etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The apparatus 1502 and the apparatus 1504 each include at least one wireless communication device (represented by the communication devices 1508 and 1514 (and the communication device 1520 if the apparatus 1504 is a relay)) for communicating with other nodes via at least one designated RAT. Each communication device 1508 includes at least one transmitter (represented by the transmitter 1510) for transmitting and encoding signals (e.g., messages, indications, information, and so on) and at least one receiver (represented by the receiver 1512) for receiving and decoding signals (e.g., messages, indications, information, pilots, and so on). Similarly, each communication device 1514 includes at least one transmitter (represented by the transmitter 1516) for transmitting signals (e.g., messages, indications, information, pilots, and so on) and at least one receiver (represented by the receiver 1518) for receiving signals (e.g., messages, indications, information, and so on). If the apparatus 1504 is a relay station, each communication device 1520 may include at least one transmitter (represented by the transmitter 1522) for transmitting signals (e.g., messages, indications, information, pilots, and so on) and at least one receiver (represented by the receiver 1524) for receiving signals (e.g., messages, indications, information, and so on).

A transmitter and a receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. A wireless communication device (e.g., one of multiple wireless communication devices) of the apparatus 1504 may also comprise a Network Listen Module (NLM) or the like for performing various measurements.

The apparatus 1506 (and the apparatus 1504 if it is not a relay station) includes at least one communication device (represented by the communication device 1526 and, optionally, 1520) for communicating with other nodes. For example, the communication device 1526 may comprise a network interface that is configured to communicate with one or more network entities via a wire-based or wireless backhaul. In some aspects, the communication device 1526 may be implemented as a transceiver configured to support wire-based or wireless signal communication. This communication may involve, for example, sending and receiving: messages, parameters, or other types of information. Accordingly, in the example of FIG. 15, the communication device 1526 is shown as comprising a transmitter 1528 and a receiver 1530. Similarly, if the apparatus 1504 is not a relay station, the communication device 1520 may comprise a network interface that is configured to communicate with one or more network entities via a wire-based or wireless backhaul. As with the communication device 1526, the communication device 1520 is shown as comprising a transmitter 1522 and a receiver 1524.

The apparatuses 1502, 1504, and 1506 also include other components that may be used in conjunction with the CSAT coordination operations as taught herein. The apparatus 1502 includes a processing system 1532 for providing functionality relating to, for example, user device operations to support CSAT coordination as taught herein and for providing other processing functionality. The apparatus 1504 includes a processing system 1534 for providing functionality relating to, for example, base station operations to support CSAT coordination as taught herein and for providing other processing functionality. The apparatus 1506 includes a processing system 1536 for providing functionality relating to, for example, network operations to support CSAT coordination as taught herein and for providing other processing functionality. The apparatuses 1502, 1504, and 1506 include memory components 1538, 1540, and 1542 (e.g., each including a memory device), respectively, for maintaining information (e.g., information indicative of reserved resources, thresholds, parameters, and so on). In addition, the apparatuses 1502, 1504, and 1506 include user interface devices 1544, 1546, and 1548, respectively, for providing indications (e.g., audible and/or visual indications) to a user and/or for receiving user input (e.g., upon user actuation of a sensing device such a keypad, a touch screen, a microphone, and so on).

For convenience, the apparatuses 1502, 1504, and/or 1506 are shown in FIG. 15 as including various components that may be configured according to the various examples described herein. It will be appreciated, however, that the illustrated blocks may have different functionality in different designs.

The components of FIG. 15 may be implemented in various ways. In some implementations, the components of FIG. 15 may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 1508, 1532, 1538, and 1544 may be implemented by processor and memory component(s) of the apparatus 1502 (e.g., by execution of appropriate code and/or by appropriate configuration of processor components). Similarly, some or all of the functionality represented by blocks 1514, 1520, 1534, 1540, and 1546 may be implemented by processor and memory component(s) of the apparatus 1504 (e.g., by execution of appropriate code and/or by appropriate configuration of processor components). Also, some or all of the functionality represented by blocks 1526, 1536, 1542, and 1548 may be implemented by processor and memory component(s) of the apparatus 1506 (e.g., by execution of appropriate code and/or by appropriate configuration of processor components).

Figure 16:
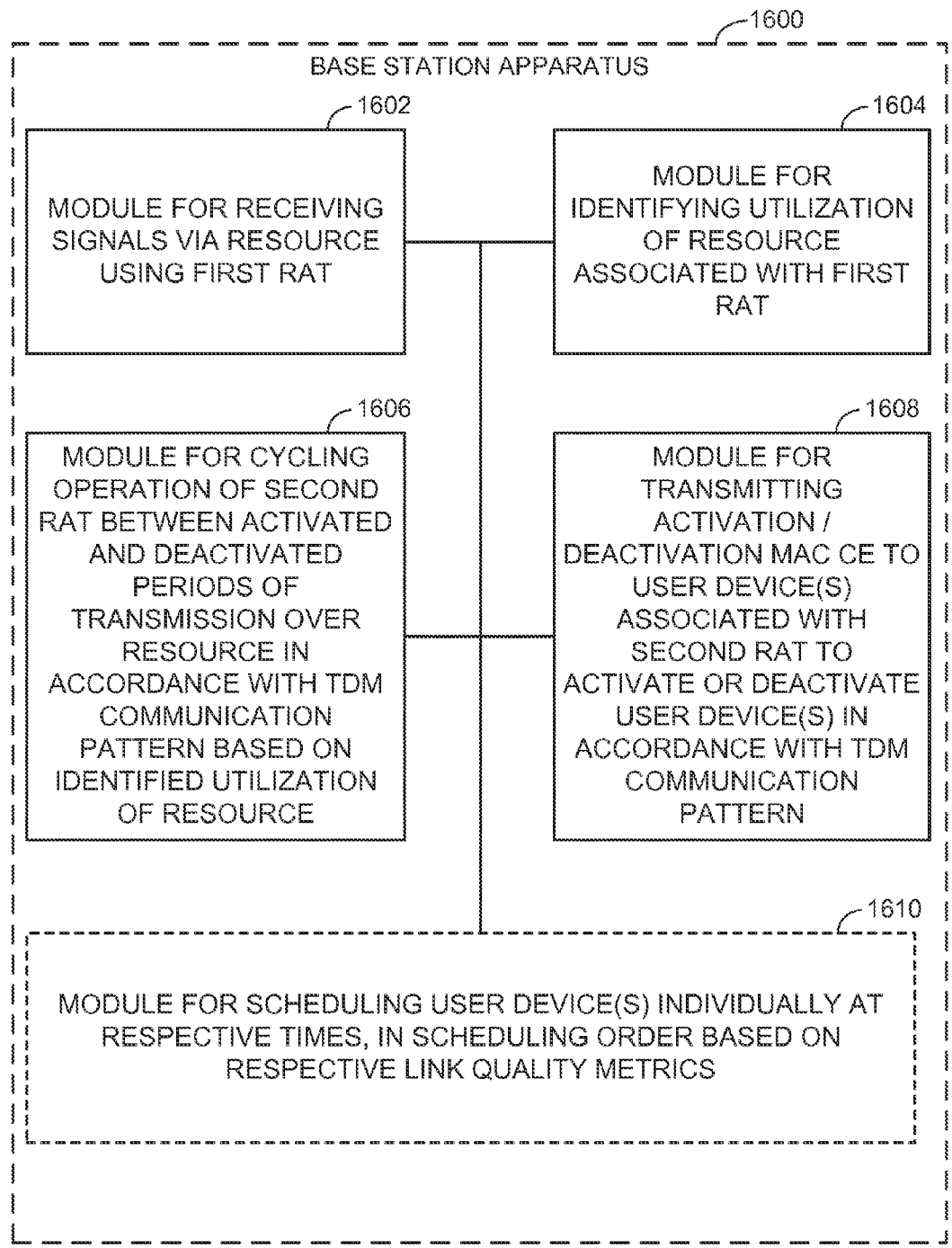
FIG. 16 is still another simplified block diagram of several sample aspects of apparatuses configured to support communication as taught herein.

FIG. 16 illustrates an example base station apparatus 1600 represented as a series of interrelated functional modules. A module for receiving 1602 may correspond at least in some aspects to, for example, a communication device as discussed herein. A module for identifying 1604 may correspond at least in some aspects to, for example, a processing system as discussed herein. A module for cycling 1606 may correspond at least in some aspects to, for example, a processing system in conjunction with a communication device as discussed herein. A module for transmitting 1608 may correspond at least in some aspects to, for example, a communication device as discussed herein.

The functionality of the modules of FIG. 16 may be implemented in various ways consistent with the teachings herein. In some designs, the functionality of these modules may be implemented as one or more electrical components. In some designs, the functionality of these blocks may be implemented as a processing system including one or more processor components. In some designs, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIG. 16, as well as other components and functions described herein, may be implemented using any suitable means. Such means also may be implemented, at least in part, using corresponding structure as taught herein. For example, the components described above in conjunction with the "module for" components of FIG. 16 also may correspond to similarly designated "means for" functionality. Thus, in some aspects one or more of such means may be implemented using one or more of processor components, integrated circuits, or other suitable structure as taught herein.

Figure 17:
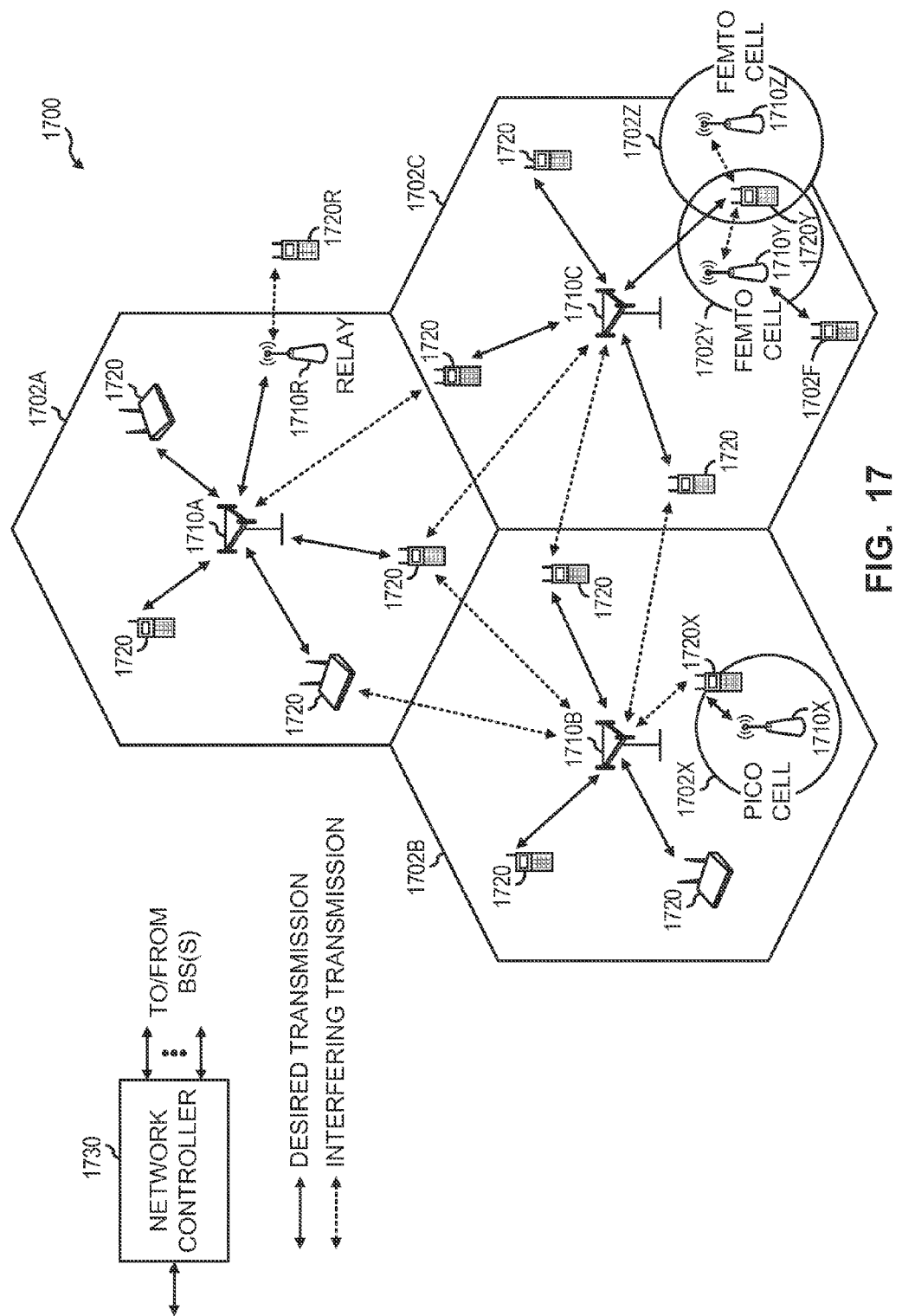
FIG. 17 illustrates an example communication system environment in which the teachings and structures herein may be incorporated.

FIG. 17 illustrates an example communication system environment in which the CSAT coordination teachings and structures herein may be incorporated. The wireless communication system 1700, which will be described at least in part as an LTE network for illustration purposes, includes a number of eNBs 1710 and other network entities. Each of the eNBs 1710 provides communication coverage for a particular geographic area, such as macro cell or small cell coverage areas.

In the illustrated example, the eNBs 1710A, 1710B, and 1710C are macro cell eNBs for the macro cells 1702A, 1702B, and 1702C, respectively. The macro cells 1702A, 1702B, and 1702C may cover a relatively large geographic area (e.g., several kilometers in radius) and may allow unrestricted access by UEs with service subscription. The eNB 1710X is a particular small cell eNB referred to as a pico cell eNB for the pico cell 1702X. The pico cell 1702X may cover a relatively small geographic area and may allow unrestricted access by UEs with service subscription. The eNBs 1710Y and 1710Z are particular small cells referred to as femto cell eNBs for the femto cells 1702Y and 1702Z, respectively. The femto cells 1702Y and 1702Z may cover a relatively small geographic area (e.g., a home) and may allow unrestricted access by UEs (e.g., when operated in an open access mode) or restricted access by UEs having association with the femto cell (e.g., UEs in a Closed Subscriber Group (CSG), UEs for users in the home, etc.), as discussed in more detail below.

The wireless network 1700 also includes a relay station 1710R. A relay station is a station that receives a transmission of data and/or other information from an upstream station (e.g., an eNB or a UE) and sends a transmission of the data and/or other information to a downstream station (e.g., a UE or an eNB). A relay station may also be a UE that relays transmissions for other UEs (e.g., a mobile hotspot). In the example shown in FIG. 17, the relay station 1710R communicates with the eNB 1710A and a UE 1720R in order to facilitate communication between the eNB 1710A and the UE 1720R. A relay station may also be referred to as a relay eNB, a relay, etc.

The wireless network 1700 is a heterogeneous network in that it includes eNBs of different types, including macro eNBs, pico eNBs, femto eNBs, relays, etc. As discussed in more detail above, these different types of eNBs may have different transmit power levels, different coverage areas, and different impacts on interference in the wireless network 1700. For example, macro eNBs may have a relatively high transmit power level whereas pico eNBs, femto eNBs, and relays may have a lower transmit power level (e.g., by a relative margin, such as a 10 dBm difference or more).

Returning to FIG. 17, the wireless network 1700 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. Unless otherwise noted, the techniques described herein may be used for both synchronous and asynchronous operation.

A network controller 1730 may couple to a set of eNBs and provide coordination and control for these eNBs. The network controller 1730 may communicate with the eNBs 1710 via a backhaul. The eNBs 1710 may also communicate with one another, e.g., directly or indirectly via a wireless or wireline backhaul.

As shown, the UEs 1720 may be dispersed throughout the wireless network 1700, and each UE may be stationary or mobile, corresponding to, for example, a cellular phone, a personal digital assistant (PDA), a wireless modem, a wireless communication device, a handheld device, a laptop computer, a cordless phone, a wireless local loop (WLL) station, or other mobile entities. In FIG. 17, a solid line with double arrows indicates desired transmissions between a UE and a serving eNB, which is an eNB designated to serve the UE on the downlink and/or uplink. A dashed line with double arrows indicates potentially interfering transmissions between a UE and an eNB. For example, UE 1720Y may be in proximity to femto eNBs 1710Y, 1710Z. Uplink transmissions from UE 1720Y may interfere with femto eNBs 1710Y, 1710Z. Uplink transmissions from UE 1720Y may jam femto eNBs 1710Y, 1710Z and degrade the quality of reception of other uplink signals to femto eNBs 1710Y, 1710Z.

Small cell eNBs such as the pico cell eNB 1710X and femto eNBs 1710Y, 1710Z may be configured to support different types of access modes. For example, in an open access mode, a small cell eNB may allow any UE to obtain any type of service via the small cell. In a restricted (or closed) access mode, a small cell may only allow authorized UEs to obtain service via the small cell. For example, a small cell eNB may only allow UEs (e.g., so called home UEs) belonging to a certain subscriber group (e.g., a CSG) to obtain service via the small cell. In a hybrid access mode, alien UEs (e.g., non-home UEs, non-CSG UEs) may be given limited access to the small cell. For example, a macro UE that does not belong to a small cell's CSG may be allowed to access the small cell only if sufficient resources are available for all home UEs currently being served by the small cell.

By way of example, femto eNB 1710Y may be an open-access femto eNB with no restricted associations to UEs. The femto eNB 1710Z may be a higher transmission power eNB initially deployed to provide coverage to an area. Femto eNB 1710Z may be deployed to cover a large service area. Meanwhile, femto eNB 1710Y may be a lower transmission power eNB deployed later than femto eNB 1710Z to provide coverage for a hotspot area (e.g., a sports arena or stadium) for loading traffic from either or both eNB 1710C, eNB 1710Z.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

In view of the descriptions and explanations above, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Accordingly, it will be appreciated, for example, that an apparatus or any component of an apparatus may be configured to (or made operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

Moreover, the methods, sequences, and/or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor (e.g., cache memory).

Accordingly, it will also be appreciated, for example, that certain aspects of the disclosure can include a computer-readable medium embodying a method for CSAT coordination.

While the foregoing disclosure shows various illustrative aspects, it should be noted that various changes and modifications may be made to the illustrated examples without departing from the scope defined by the appended claims. The present disclosure is not intended to be limited to the specifically illustrated examples alone. For example, unless otherwise noted, the functions, steps, and/or actions of the method claims in accordance with the aspects of the disclosure described herein need not be performed in any particular order. Furthermore, although certain aspects may be described or claimed in the singular, the plural is contemplated unless limitation to the singular is explicitly stated.

What is claimed is:

1. A method of communication for reducing interference between Radio Access Technologies (RATs), comprising:
   receiving signals via a resource, wherein a first RAT is used to receive the signals;
   identifying utilization of the resource associated with the first RAT, wherein the identification is based on the received signals;
   determining a Time Division Multiplexing (TDM) communication pattern based on the identified utilization of the resource, wherein the TDM communication pattern includes an activated period and a deactivated period;
   transmitting to a first user device and a second user device an Activation/Deactivation Medium Access Control (MAC) Control Element (CE) to deactivate the first user device and the second user device during the deactivated period;
   determining a first link quality metric associated with the first user device and a second link quality metric associated with the second user device;
   setting a first activation time within the activated period for the first user device and a second activation time within the activated period for the second user device, wherein:
      the first activation time is set earlier than the second activation time in response to a determination that the first link quality metric is associated with lower link quality than the second link quality metric;
      the first activation time is set later than the second activation time in response to a determination that the first link quality metric is associated with higher link quality than the second link quality metric;
   transmitting to the first user device and the second user device another Activation/Deactivation MAC CE configured to activate the first user device and the second user device during the activated period, wherein the another Activation/Deactivation MAC CE is further configured to activate the first user device at the first activation time within the activated period and activate the second user device at the second activation time within the activated period.

2. The method of claim 1, further comprising selecting a Modulation and Coding Scheme (MCS) for one or more of the first user device and the second user device based on a last available valid Channel Quality Indicator (CQI) for the user device and a backoff factor.

3. The method of claim 1, further comprising:
   wherein the another Activation/Deactivation MAC CE is transmitted in advance of a corresponding activated period of the TDM communication pattern by an activation margin.

4. The method of claim 1, wherein the another Activation/Deactivation MAC CE activates a respective user device for a corresponding activated period of the TDM communication pattern, the method further comprising:
   transmitting a deactivation timer value to the respective user device to cause the respective user device to deactivate after expiration of the corresponding activated period.

5. The method of claim 1, further comprising:
   scheduling one or more of the first user device and the second user device for data transmission during the activated period and refraining from issuing any scheduling grants to the one or more of the first user device and the second user device in advance of expiration of the activated period of the TDM communication pattern by a guard duration.

6. The method of claim 1, wherein the resource is an unlicensed radio frequency band.

7. The method of claim 1, wherein:
   the first RAT comprises Wi-Fi technology; and
   the second RAT comprises LTE technology.

8. The method of claim 1, wherein the first activated period and the second activated period have durations that are greater than or equal to two-hundred milliseconds.

9. The method of claim 1, further comprising scheduling the first user device for communication at a first scheduled time within the activated period and the second user device for communication at a second scheduled time within the activated period, wherein:
   the first scheduled time is set earlier than the second scheduled time in response to a determination that the first link quality metric is associated with higher link quality than the second link quality metric;
   the first scheduled time is set later than the second scheduled time in response to a determination that the first link quality metric is associated with lower link quality than the second link quality metric.

10. The method of claim 9, wherein the another Activation/Deactivation MAC CE is configured to:
   activate the first user device at the first activation time within the activated period and schedule the first user device at the first scheduling time within the activated period; and
   activate the second user device at the second activation time within the activated period and schedule the second user device at the second scheduling time within the activated period.

11. A method of communication for reducing interference between Radio Access Technologies (RATs), comprising:
   receiving signals via a resource, wherein a first RAT is used to receive the signals;
   identifying utilization of the resource associated with the first RAT, wherein the identification is based on the received signals;
   cycling operation of a second RAT between activated and deactivated periods of transmission over the resource in accordance with a Time Division Multiplexing (TDM) communication pattern, wherein the cycling is based on the identified utilization of the resource; and
   transmitting an Activation/Deactivation Medium Access Control (MAC) Control Element (CE) to a user device associated with the second RAT to activate or deactivate a Secondary Cell (SCell) configured at the user device in accordance with the TDM communication pattern;
   monitoring ramp-up times for a plurality of user devices;

classifying each of the plurality of user devices as a fast or a slow ramp-up user device based on the monitored ramp-up times;
transmitting a Radio Resource Control (RRC) connection configuration message to slow ramp-up user devices to add a SCell corresponding to the second RAT to a set of serving cells for the user device for activated periods of the TDM communication pattern; and
transmitting an RRC connection deconfiguration message to the slow ramp-up user devices to remove the SCell from the set of serving cells for the user device for deactivated periods of the TDM communication pattern.

12. The method of claim 11, further comprising scheduling each of the plurality of user devices individually at respective times, in a scheduling order based on the monitored ramp-up times, wherein the scheduling order prioritizes scheduling grants to a user device having a faster ramp-up time as compared to a user device having a slower ramp-up time.

13. An apparatus for communication for reducing interference between Radio Access Technologies (RATs), comprising:
a first transceiver configured to receive signals via a resource, wherein a first RAT is used to receive the signals;
at least one memory;
at least one processor coupled to the at least one memory, the at least one processor and the at least one memory being configured to:
identify utilization of the resource associated with the first RAT, wherein the identification is based on the received signals;
determine a Time Division Multiplexing (TDM) communication pattern based on the identified utilization of the resource, wherein the TDM communication pattern includes an activated period and a deactivated period;
determine a first link quality metric associated with a first user device and a second link quality metric associated with a second user device; and
set a first activation time within the activated period for the first user device and a second activation time within the activated period for the second user device, wherein:
the first activation time is set earlier than the second activation time in response to a determination that the first link quality metric is associated with lower link quality than the second link quality metric;
and
the first activation time is set later than the second activation time in response to a determination that the first link quality metric is associated with higher link quality than the second link quality metric; and
a second transceiver configured to:
transmit to the first user device and the second user device an Activation/Deactivation Medium Access Control (MAC) Control Element (CE) to deactivate the first user device and the second user device during the deactivated period; and
transmit to the first user device and the second user device another Activation/Deactivation MAC CE configured and the second user device during the activated period, wherein the another Activation/Deactivation MAC CE is configured to activate the first user device at the first activation time within the activated period and activate the second user device at the second activation time within the activated period.

14. The apparatus of claim 13, wherein the at least one processor and the at least one memory are further configured to select a Modulation and Coding Scheme (MCS) for one or more of the first user device and the second user device based on a last available valid Channel Quality Indicator (CQI) for the user device and a backoff factor.

15. The apparatus of claim 13, wherein the another Activation/Deactivation MAC CE is transmitted in advance of a corresponding activated period of the TDM communication pattern by an activation margin.

16. The apparatus of claim 13, wherein the another Activation/Deactivation MAC CE activates a respective user device for a corresponding activated period of the TDM communication pattern, the second transceiver being further configured to transmit a deactivation timer value to the respective user device to cause the respective user device to deactivate after expiration of the corresponding activated period.

17. The apparatus of claim 13, wherein the at least one processor and the at least one memory are further configured to schedule one or more of the first user device and the second user device for data transmission during the activated period and refrain from issuing any scheduling grants to the one or more of the first user device and the second user device in advance of expiration of the activated period of the TDM communication pattern by a guard duration.

18. The apparatus of claim 13, wherein the resource is an unlicensed radio frequency band.

19. The apparatus of claim 13, wherein:
the first RAT comprises Wi-Fi technology; and
the second RAT comprises LTE technology.

20. An apparatus for communication for reducing interference between Radio Access Technologies (RATs), comprising:
a first transceiver configured to receive signals via a resource, wherein a first RAT is used to receive the signals;
at least one memory;
at least one processor coupled to the at least one memory, the at least one processor and the at least one memory being configured to:
identify utilization of the resource associated with the first RAT, wherein the identification is based on the received signals, and to cycle operation of a second RAT between activated and deactivated periods of transmission over the resource in accordance with a Time Division Multiplexing (TDM) communication pattern, wherein the cycling is based on the identified utilization of the resource; and
monitor ramp-up times for a plurality of user devices, and to classify each of the plurality of user devices as a fast or a slow ramp-up user device based on the monitored ramp-up times; and
a second transceiver configured to:
transmit an Activation/Deactivation Medium Access Control (MAC) Control Element (CE) to a user device associated with the second RAT to activate or deactivate a Secondary Cell (SCell) configured at the user device in accordance with the TDM communication pattern; and
transmit a Radio Resource Control (RRC) connection configuration message to slow ramp-up user devices to add a SCell corresponding to the second RAT to a set of serving cells for the user device for activated periods of the TDM communication pattern, and to transmit an RRC connection deconfiguration message to the slow ramp-up user devices to remove the SCell from the set of serving cells for the user device for deactivated periods of the TDM communication pattern.

21. The apparatus of claim 20, wherein the at least one processor and the at least one memory are further configured to schedule each of the plurality of user devices individually at respective times, in a scheduling order based on the monitored ramp-up times, wherein the scheduling order prioritizes scheduling grants to a user device having a faster ramp-up time as compared to a user device having a slower ramp-up time.

22. An apparatus for communication for reducing interference between Radio Access Technologies (RATs), comprising:
means for receiving signals via a resource, wherein a first RAT is used to receive the signals;
means for identifying utilization of the resource associated with the first RAT, wherein the identification is based on the received signals;
means for determining a Time Division Multiplexing (TDM) communication pattern based on the identified utilization of the resource, wherein the TDM communication pattern includes an activated period and a deactivated period;
means for transmitting to a first user device and a second user device an Activation/Deactivation Medium Access Control (MAC) Control Element (CE) to deactivate the first user device and the second user device during the deactivated period;
means for determining a first link quality metric associated with the first user device and a second link quality metric associated with the second user device;
means for setting a first activation time within the activated period for the first user device and a second activation time within the activated period for the second user device, wherein:
the first activation time is set earlier than the second activation time in response to a determination that the first link quality metric is associated with lower link quality than the second link quality metric; and
the first activation time is set later than the second activation time in response to the determination that the first link quality metric is associated with higher link quality than the second link quality metric; and
means for transmitting to the first user device and the second user device another Activation/Deactivation MAC CE configured to activate the first user device and the second user device during the activated period, wherein the another Activation/Deactivation MAC CE is further configured to activate the first user device at the first activation time within the activated period and activate the second user device at the second activation time within the activated period.

23. A non-transitory computer-readable medium comprising instructions, which, when executed by a processor, cause the processor to perform operations for communication for reducing interference between Radio Access Technologies (RATs), the non-transitory computer-readable medium comprising:
instructions for receiving signals via a resource, wherein a first RAT is used to receive the signals;
instructions for identifying utilization of the resource associated with the first RAT, wherein the identification is based on the received signals;
instructions for determining a Time Division Multiplexing (TDM) communication pattern based on the identified utilization of the resource, wherein the TDM communication pattern includes an activated period and a deactivated period;
instructions for transmitting to a first user device and a second user device an Activation/Deactivation Medium Access Control (MAC) Control Element (CE) to deactivate the first user device and the second user device during the deactivated period;
instructions for determining a first link quality metric associated with the first user device and a second link quality metric associated with the second user device;
instructions for setting a first activation time within the activated period for the first user device and a second activation time within the activated period for the second user device, wherein:
the first activation time is set earlier than the second activation time in response to a determination that the first link quality metric is associated with lower link quality than the second link quality metric; and
the first activation time is set later than the second activation time in response to the determination that the first link quality metric is associated with higher link quality than the second link quality metric; and
instructions for transmitting to the first user device and the second user device another Activation/Deactivation MAC CE configured to activate the first user device and the second user device during the activated period, wherein the another Activation/Deactivation MAC CE is further configured to activate the first user device at the first activation time within the activated period and activate the second user device at the second activation time within the activated period.

24. A method, comprising:
determining a Time Division Multiplexing (TDM) communication pattern, wherein the TDM communication pattern includes an activated period and a deactivated period;
determining a first link quality metric associated with a first user device and a second link quality metric associated with a second user device;
setting a first activation time and a first scheduling time associated with the activated period for the first user device and a second activation time and a second scheduling time associated with the activated period for the second user device, wherein:
in response to a determination that the first link quality metric is associated with lower link quality than the second link quality metric, the first activation time is set earlier than the second activation time and the first scheduling time is set later than the second scheduling time; and
in response to a determination that the first link quality metric is associated with higher link quality than the second link quality metric, the first activation time is set later than the second activation time and the first scheduling time is set earlier than the second scheduling time;
transmitting a message to the first user device and the second user device, wherein the message is configured to activate and schedule the first user device and the second user device during the activated period, wherein the message is further configured to activate the first user device at the first activation time, schedule the first user device at the first scheduling time, activate the second user device at the second activation time, and schedule the second user device at the second scheduling time.

25. The method of claim 24, wherein the message is an Activation/Deactivation Medium Access Control (MAC) Control Element (CE).

26. The method of claim 24, further comprising:
receiving signals via a resource, wherein a first radio access technology is used to receive the signals; and
identifying utilization of the resource associated with the first radio access technology, wherein the identification is based on the received signals;
wherein:
the determining of the TDM communication pattern comprises determining, based on the identified utilization of the resource associated with the first radio access technology, a relative duration of the activated period and the deactivated period; and
the first scheduling time associated with the activated period and the second scheduling time associated with the activated period are times at which the first user device and the second user device are respectively scheduled to communicate in accordance with a second radio access technology.

* * * * *